United States Patent
Yotoriyama

(10) Patent No.: US 7,281,981 B2
(45) Date of Patent: Oct. 16, 2007

(54) IMAGE GENERATION METHOD, PROGRAM, AND INFORMATION STORAGE MEDIUM

(75) Inventor: Hiroaki Yotoriyama, Kawasaki (JP)

(73) Assignee: Namco Bandai Games Inc., Tokyo (JP)

( * ) Notice: Subject to any disclaimer, the term of this patent is extended or adjusted under 35 U.S.C. 154(b) by 586 days.

(21) Appl. No.: 10/225,136

(22) Filed: Aug. 22, 2002

(65) Prior Publication Data
US 2003/0038428 A1    Feb. 27, 2003

(30) Foreign Application Priority Data
Aug. 23, 2001    (JP)    ............... 2001-253496

(51) Int. Cl.
| | | |
|---|---|---|
| G06F 17/00 | (2006.01) | |
| G06F 19/00 | (2006.01) | |
| G06T 1/00 | (2006.01) | |
| G06T 17/00 | (2006.01) | |
| G06T 15/00 | (2006.01) | |

(52) U.S. Cl. ..................... 463/32; 463/30; 463/31; 463/33; 345/418; 345/419; 345/420

(58) Field of Classification Search ............ 463/30–33; 345/418–420
See application file for complete search history.

(56) References Cited

U.S. PATENT DOCUMENTS

| | | | | |
|---|---|---|---|---|
| 4,327,919 A | * | 5/1982 | Vennor | ................... 273/236 |
| 4,488,727 A | * | 12/1984 | Lam | ........................ 273/236 |
| 6,322,448 B1 | | 11/2001 | Kaku et al. | |
| 6,425,824 B1 | * | 7/2002 | Baerlocher et al. | ........... 463/16 |

(Continued)

FOREIGN PATENT DOCUMENTS

JP    A 11-086031    3/1999

(Continued)

OTHER PUBLICATIONS

Soul Calibur for Dreamcast: Instruction Manual. Soul Calibur Released on 0000-00-00. Scanned Copy. [online] [retrieved on Oct. 20, 2005] Retrieved from The Game Manual Archive <URL: http://www.gamemanuals.net/>. Attacking PDF Print Out (16 pages).*

(Continued)

*Primary Examiner*—Robert E. Pezzuto
*Assistant Examiner*—Milap Shah
(74) *Attorney, Agent, or Firm*—Oliff & Berridge, PLC

(57)    ABSTRACT

Triangular relation is introduced such that a vertical-attribute attack B1 (first action) is more advantageous than a horizontal-attribute attack B2 (second action); the horizontal-attribute attack B2 is more advantageous than a movement action B3 (third action); and the movement action B3 is more advantageous than the vertical-attribute attack B1. If the vertical and horizontal attribute attacks occur at the same time, hit check is carried out using pseudo hit areas each of which is larger then than hit areas specified by the orbits of attacks, the amount of axis following compensation for character is set to be larger, or the judgment of hit is canceled even when the attacks hit against each other. If an attribute parameter (or difficulty level setting) for any one of the vertical-attribute attack, horizontal-attribute attack, and movement action is changed, the attribute parameters for the other actions are also changed at the same time.

27 Claims, 22 Drawing Sheets

U.S. PATENT DOCUMENTS

| | | | |
|---|---|---|---|
| 6,483,939 | B2 | 11/2002 | Ochi et al. |
| 6,533,663 | B1 * | 3/2003 | Iwao et al. ............ 463/32 |
| 6,718,058 | B2 | 4/2004 | Ochi et al. |
| 6,949,024 | B2 | 9/2005 | Kaku et al. |
| 2001/0029201 | A1 * | 10/2001 | Minami ............ 463/31 |
| 2002/0013172 | A1 | 1/2002 | Kaku et al. |
| 2005/0266920 | A1 | 12/2005 | Kaku et al. |
| 2005/0282630 | A1 | 12/2005 | Kaku et al. |

FOREIGN PATENT DOCUMENTS

| | | |
|---|---|---|
| JP | A 11-156049 | 6/1999 |
| JP | A 2000-037560 | 2/2000 |
| JP | A 2000-334167 | 12/2000 |
| JP | 2004209295 A * | 7/2004 |
| WO | WO97/46295 | 12/1997 |

OTHER PUBLICATIONS

Soul Blade for Sony PlayStation: Instruction Manual. Soul Blade Released Nov. 16, 1997. Scanned Copy [online] [retrieved on Dec. 6, 2006]. Retrieved from The Game Manual Archive <URL: http://www.gamemanuals.net/>.*

Soul Edge Arcade Game: Installation Manual. Soul Edge Released in 1996. Scanned Copy [online] [retrieved on Dec. 6, 2006]. Retrieved from The Game Manual Archive <URL: http://www.gamemanuals.net/>.*

IGN.com: Soul Calibur Review. Dated Sep. 20, 1999. [online] [retrieved on Dec. 6, 2006]. Retrieved from IGN.com <URL: http://dreamcast.ign.com/articles/160/160953p1.html>.*

Wikipedia, The Free Encyclopedia: "Soul Edge". [online] [retrieved on Dec. 6, 2006]. Retrieved from Wikipedia.com <URL: http://en.wikipedia.org/wiki/Soul_Edge>.*

Killer List of Video Games: "Soul Edge VersionII". [online] [retrieved Dec. 13, 2006]. Retrieved from The Killer List of Video Games <URL: http://www.klov.com/game_detail.php?letter=&game_id=9639>.*

Sirlin.net: "Rock, Paper, & Scissors in Stratey Games". Dated Aug. 3, 2001. [online] [retrieved Dec. 6, 2006]. Retrieved From Sirlin.net via Archive.org <URL: http://web.archive.org/web/20010803005334/http://www.sirlin.net/Features/feature_rps.htm>.*

Gingold, Yotam. "From Rock, Paper, Scissors to Street Fighter II: Proof by Construction". [online] [retrieved Dec. 6, 2006].*

Wikipedia, The Free Encyclopedia: "Killer Instinct 2". [online] [retrieved on Dec. 5, 2006]. Retrieved from Wikipedia.com <URL: http://en.wikipedia.org/wiki/Killer_instinct_2>.*

Killer List of Video Games: "Killer Instinct 2". [online] [retrieved Dec. 5, 2006]. Retrieved from The Killer List of Video Games <URL: http://www.klov.com/game_detail.php?letter=&game_id=8309>.*

Dead or Alive 2 for Sega Dreamcast: Instruction Manual. Dead or Alive 2 Released Mar. 14, 2000. Acanned Copy [online] [retrieved on Dec. 6, 2006]. Retrieved from The Game Manual Archive <URL: http://www.gamemanuals.net/>.*

Wikipedia, The Free Encyclopedia: "Rock, Paper, Scissors". [online] [retrieved on Dec. 13, 2006]. Retrieved from Wikipedia.com <URL: http://en.wikipedia.org/wiki/Rock-paper-scissors>.*

"V Jump Books [Game Series] Bloody Roar 3 PlayStation 2 Version", Mar. 6, 2001 (w/ English translation).

Shibata et al.; "Narukagami-Okuden"; Bushido Blade Hints-And Tips Book, DigiCube, Jun. 6, 1997; p. 39; (with English Translation).

MediaWorks; "Tearing Saga; Record of Hero War in Yutona"; Dengeki PlayStation, Jul. 27, 2001, vol. 7, No. 19, pp. 68-73; (with English Translation).

Softbank Publishing INc.; "Dead or Alive2, Perfect Guide"; The PlayStation Books; A One Office; Jun. 26, 2000, pp. 13-24 (with English Translation).

Sega Corporation; "Gundam Battle Online"; Famitsu DC; Aug. 1, 2001, vol. 3, No. 9, pp. 56-59 (with English Translation).

* cited by examiner

HORIZONTAL ATTACK VS MOVEMENT

HORIZONTAL ATTACK VS MOVEMENT

MOVEMENT VS VERTICAL ATTACK

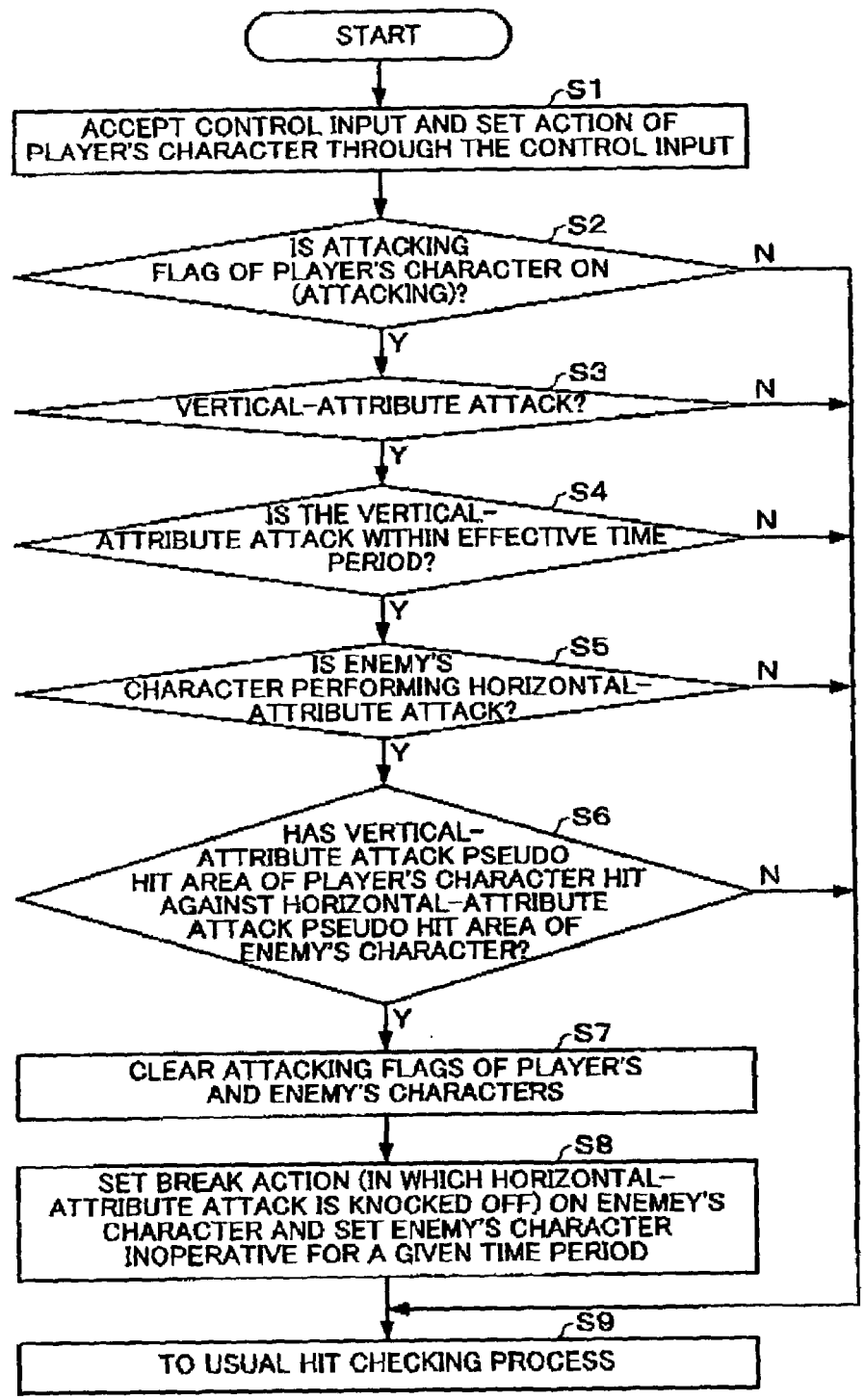

IMAGE GENERATION METHOD, PROGRAM, AND INFORMATION STORAGE MEDIUM

Japanese Patent Application No. 2001-253496, filed on Aug. 23, 2001, is hereby incorporated by reference in its entirety.

BACKGROUND OF THE INVENTION

The present invention relates to a method, program and information storage medium for image generation.

There is known an image generating system (or game system) for generating an image as viewed through a virtual camera (or a given viewpoint) within an object space which is a virtual three-dimensional space. Such an image generating system is highly popular as one that can provide a so-called virtual reality. For example, in an image generating system for fighting game, a player can control its own character (or model object) through a game controller (or control unit) and enjoy the fighting game in which the player's character fights against an enemy character controlled by another player or a computer.

Three-dimensional fighting games known heretofore firmly left some elements which are included in an extension of a so-called two-dimensional fighting game. For example, if it is to be determined whether or not any one of player's character and enemy character wins the other character in the fighting game, the issue was decided through a technique familiar to the two-dimensional fighting game. Thus, one of many features in the three-dimensional fighting game that the characters can freely run about the object space could not fully be employed by the prior art. Therefore, the prior art could not provide a preferred operating environment which could easily be understood by players.

BRIEF SUMMARY OF THE INVENTION

One aspect of the present invention relates to an image generation method of generating an image comprising:

controlling an action of each of a plurality of characters through a control input by each of a plurality of players;

setting one of the characters performing a first action more advantageously than another character when the one character performs the first action and the other character performs a second action;

setting one of the characters performing a second action more advantageously than another character when the one character performs the second action and the other character performs a third action;

setting one of the characters performing a third action more advantageously than another character when the one character performs the third action and the other character performs the first action; and generating an image viewed through a virtual camera within an object space in which a plurality of objects including the characters are disposed.

Another aspect of the present invention relates to an image generation method of generating an image comprising:

controlling an action of each of a plurality of characters through a control input by each of a plurality of players;

setting one of the characters, which performs a vertical-attribute attack in a direction substantially along a vertical plane, more advantageously than another character when the one character performs the vertical-attribute attack and the other character performs a horizontal-attribute attack in a direction substantially along a horizontal plane; and generating an image viewed through a virtual camera within an object space in which a plurality of objects including the characters are disposed.

BRIEF DESCRIPTION OF THE SEVERAL VIEWS OF THE DRAWING

FIGS. 7A, 7B and 7C illustrate a hit-check technique using pseudo areas and the like.

FIG. 18 is a flowchart illustrating the details of a process according to this embodiment.

DETAILED DESCRIPTION OF THE EMBODIMENT

Figure 1:
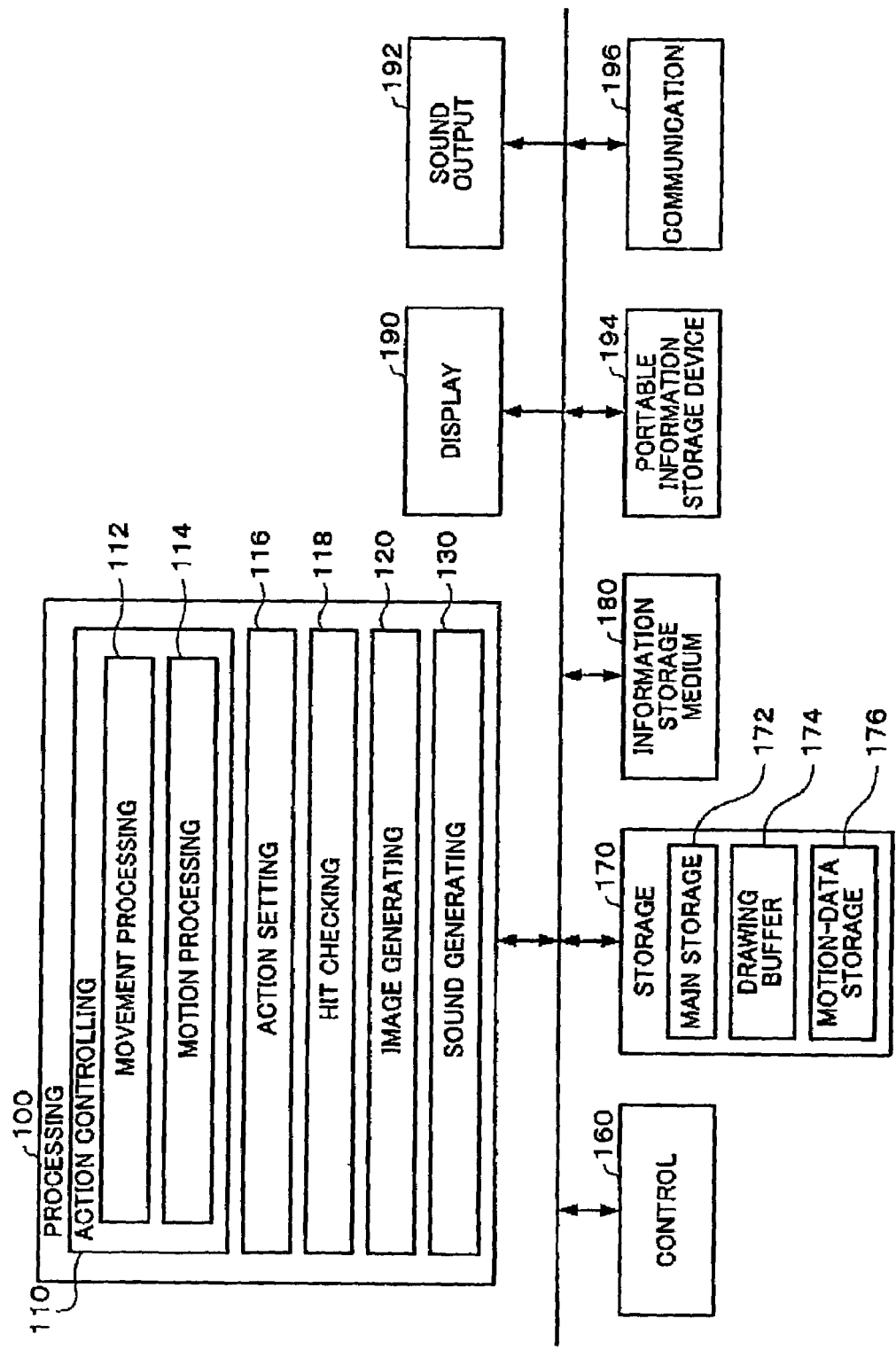
FIG. 1 is a functional block diagram of an image generating system according to this embodiment.

Embodiments of the present invention is described below.

Note that the embodiments described below do not in any way limit the scope of the present invention defined by the claims laid out herein. In addition, all the elements of the embodiments described below should not be taken as essential requirements of the present invention.

One embodiment of the present invention relates to an image generation method of generating an image comprising:

controlling an action of each of a plurality of characters through a control input by each of a plurality of players;

setting one of the characters performing a first action more advantageously than another character when the one character performs the first action and the other character performs a second action;

setting one of the characters performing a second action more advantageously than another character when the one character performs the second action and the other character performs a third action;

setting one of the characters performing a third action more advantageously than another character when the one character performs the third action and the other character performs the first action; and generating an image viewed through a virtual camera within an object space in which a plurality of objects including the characters are disposed.

According to this embodiment, the first action (movement or motion) of the character is set more advantageously (dominantly) than the second action; the second action is set more advantageously than the third action; and the third action is set more advantageously than the first action. Therefore, a player controlling a character can grasp which action should be performed by the player's character so as to be more advantageous than the enemy character as soon as the player visualizes the aforementioned triangular relation between the first, second and third actions. This can provide a preferred game control environment which can easily be understood by the player.

In this embodiment, the first action may be a vertical- (longitudinal-) attribute attack performed in a direction substantially along a vertical plane, the second action may be a horizontal-attribute attack performed in a direction substantially along a horizontal plane, and one of the characters performing the vertical-attribute attack may be set more advantageously than another character, when the one character performs the vertical-attribute attack and the other character performs the horizontal-attribute attack.

In such a manner, it can be prevented that the players more perform the horizontal-attribute attack by which the probability of winning is generally increased. This can prevent the development of the game from becoming unvaried.

In this embodiment, when a first hit area of the vertical-attribute attack performed by one of the characters hits a second hit area of the horizontal-attribute attack performed by another character, the other character may be caused to perform an action showing that the other character has been attacked or to be inoperative for a given time period.

In such a manner, by the vertical-attribute attack performed by the one character, the other character performs an action showing that the other character has been attacked, or becomes inoperative for a given time period, and thereby the processing which sets the one character more advantageous can be realized.

In this embodiment, the first hit area may be a first pseudo hit area larger than a hit area specified by an orbit of the vertical-attribute attack performed by the one character, and the second hit area may be a second pseudo hit area larger than a hit area specified by an orbit of the horizontal-attribute attack performed by the other character.

In such a manner, an image can be represented in which the vertical- and horizontal-attribute attacks more frequently hit each other when the vertical- and horizontal-attribute attacks occur simultaneously, and thereby the stage effects in the generated image can be improved.

In this embodiment, the second action may be a horizontal-attribute attack performed in a direction substantially along a horizontal plane, the third action may be a movement action in which one of the characters moves in an arbitrary direction within the object space, and one of the characters performing the horizontal-attribute attack may be set more advantageously than another character, when the one character performs the horizontal-attribute attack and the other character performs the movement action.

In such a manner, it can be represented that the horizontal-attribute attack is stronger than the movement action, and thereby a realistic image which does not give an unnatural impression to players can be generated.

In this embodiment, the amount of compensation by which the one character is turned toward the other character may be set to be larger than other attacking actions, when the one character performs the horizontal-attribute attack and the other character performs the movement action.

In such a manner, the one character can be turned more easily toward the other character so as to realize the processing which sets the one character more advantageous than the other character.

In this embodiment, the third action may be a movement action in which one of the characters moves in an arbitrary direction within the object space, the first action may be a vertical-attribute attack performed in a direction substantially along a vertical plane, and one of the characters performing the movement action may be set more advantageously than another character, when the one character performs the movement action and the other character performs the vertical-attribute attack.

In such a manner, it can be represented that the movement action is stronger than the vertical-attribute attack, and thereby a realistic image which will not give an unnatural impression to players can be generated.

In this embodiment, a hit-judgment may be canceled when one of the characters performs the movement action and another character performs the vertical-attribute attack, even when the vertical-attribute attack by the other character is judged to have hit the one character.

In such a manner, a hit-judgment can be canceled even when the vertical-attribute attack by the other character is judged to have hit the one character, and thereby the processing which sets the one character more advantageously than the other character can be realized.

In this embodiment, a hit-judgment may be canceled when the one character is out of a given range of angles including a direction which the other character faces, even when the vertical-attribute attack by the other character is judged to have hit the one character.

In such a manner, the generation of an unnatural image caused by canceling the hit-judgement of the vertical-attribute attack performed by the other character although the one character is in front of the other character can be avoided.

In this embodiment, a position or direction of the virtual camera may be changed such that a hit point is invisible from the virtual camera, when a hit-judgment is canceled.

In such a manner, a situation that an inconsistent image, in which the vertical-attribute attack by the other character appears to have hit the one character in spite of the fact that the hit-judgment has been canceled, is seen from the players can be avoided.

In this embodiment, a compensated image in which the vertical-attribute attack by the other character appears not to have hit the one character may be generated on generation of a replay image, when a hit-judgment is canceled.

In such a manner, a situation that an inconsistent image, in which the vertical-attribute attack by the other character appears to have hit the one character in spite of the fact that the hit-judgment has been canceled, is generated as a replay image can be avoided.

In this embodiment, when an attribute parameter for offense and defense in any one of the first, second and third actions is changed, an attribute parameter for offense and defense in at least one of the other actions may also be changed at the same time.

In such a manner, this can prevent the superiority between the offense and defense from being unbalanced. Thus, various balances of the game can be adjusted with maintaining the balance of the superiority between offense and defense.

Another embodiment of the present invention also relates to an image generation method of generating an image comprising:

controlling an action of each of a plurality of characters through a control input by each of a plurality of players;

setting one of the characters, which performs a vertical-attribute attack in a direction substantially along a vertical plane, more advantageously than another character when the one character performs the vertical-attribute attack and the other character performs a horizontal-attribute attack in a direction substantially along a horizontal plane; and generating an image viewed through a virtual camera within an object space in which a plurality of objects including the characters are disposed.

According to this embodiment, a vertical-attribute attack is set to be more advantageous than a horizontal-attribute attack. Thus, it can be prevented that the players more perform the horizontal-attribute attack by which the probability of winning is generally increased. This can prevent the development of the game from becoming unvaried.

One embodiment of the present invention will now be described in more detail with reference to the accompanying figures.

1. Configuration

FIG. 1 shows a block diagram of an image generating system (game system) according to this embodiment. In this figure, this embodiment may comprise at least a processing unit 100 (or a processing unit 100 with a storage unit 170). Each of the other blocks may take any suitable form.

A control unit 160 is used to input operational data from the player and the function thereof may be realized through any suitable hardware means such as a lever, a button, a microphone, a sensor, or a housing.

The storage unit 170 provides a working area for the processing unit 100, communication unit 196 and others.

The function thereof may be realized by any suitable hardware means such as RAM or the like.

An information storage medium (which may be a computer-readable storage medium) 180 is designed to store information including programs, data and others. The function thereof may be realized through any suitable hardware means such as optical memory disk (CD or DVD), magneto-optical disk (MO), magnetic disk, hard disk, magnetic tape, memory (ROM) or the like. The processing unit 100 performs various processings in the present invention (or this embodiment) based on a program (or data) that has been stored in this information storage medium 180. In other words, the information storage medium 180 stores (or records or contains) a program (which is one that causes a computer to realize the respective processings of the present invention) for functioning the computer as the respective processings of the present invention (or this embodiment) which are particularly represented by the blocks included in the processing unit 100.

Part or the whole of the information stored in the information storage medium 180 will be transferred to the storage unit 170 when the system is initially powered on. The information storage medium 180 may also contain a program for performing the processings of the present invention, image data, sound data, shape data of objects to be displayed and so on.

A display unit 190 is to output an image generated according to this embodiment and the function thereof can be realized by any suitable hardware means such as CRT, LCD or HMD (Head-Mount Display).

A sound output unit 192 is to output a sound generated according to this embodiment and the function thereof can be realized by any suitable hardware means such as speaker.

A portable information storage device 194 is to store the player's personal data and save data and maybe take any suitable form such as memory card, portable game machine and so on.

A communication unit 196 is designed to perform various controls for communication between the game system and any external device (e.g., host device or other image generating system). The function thereof may be realized through any suitable hardware means such as various types of processors or communication ASIS or according to any suitable program.

The program (or data) for causing the computer to realize the processings in the present invention (or this embodiment) may be delivered from an information storage medium included in a host device (or server) to the information storage medium 180 through a network and the communication unit 196. The use of such an information storage medium in the hose device (or server) falls within the scope of the invention.

The processing unit (processor) 100 is to perform various processings such as game processing, image generating or sound generating, based on the control data or program from the control unit 160. In such a case, the processing unit 100 uses a main storage section 172 in the storage unit 170 as a working area for performing the respective processings.

The processing unit 100 may be designed to perform various processes such as coin (or charge) reception, setting of various modes, game proceeding, setting of scene selection, determination of the position and rotation angle (about X-, Y- or Z-axis) of an object, movement of the object (motion processing), determination of the position of the viewpoint (or virtual camera) and the angle of visual line (or the rotational angle of the virtual camera), arrangement of the object within the object space, hit checking, computation of the game results (or scores), processing for causing a plurality of players to play in a common game space and various other game processings including game-over.

The processing unit 100 comprises an action control section 110, an action setting section 116, a hit check section 118, an image generating section 120 and a sound generating section 130. However, the processing unit 100 is not necessarily required to include all these function blocks.

The action control section 110 is designed to control the action (including movement and motion) of a character controlled by a player and comprises a movement processing portion 112 and a motion processing portion 114.

The movement processing portion 112 is designed to control the movement of a character (including a model character and a moving object).

More particularly, the movement processing portion 112 is designed to move (or translate or rotate) the character within an object space (or game space). The movement of the character can be realized by determining the position and rotation angle of the character in the present frame (inter), based on control data from the control unit 160 (or input data from the player) and the position, rotational angle (or direction) and others of the character in the previous frame (for example, before 1/60 seconds, 1/30 seconds). It is now assumed, for example, that the position and rotation angle of the character in a frame (k-1) is Pk-1 and θk-1 and that the amounts of change relating to the position and rotation of the character through one frame (that is, velocity and rotational velocity) are ΔP and Δθ. Thus, the position and rotation angle (Pk, θk) of the character in a frame (k) may be determined through the following formulas:

$$Pk = Pk\text{-}1 + \Delta P \quad (1)$$

$$\theta k = \theta k\text{-}1 + \Delta \theta \quad (2)$$

The motion processing portion 114 is designed to perform a processing (motion play or motion generation) for causing a character (or model object) to do a motion (or animation). This motion processing for the character can be realized by playing the motion of the character, based on motion data which have been stored in a motion-data storage section 176.

More particularly, the motion-data storage section 176 has stored motion data including the position or rotation angle (of a child bone relative to a parent bone about three-axes) of each of bones forming the skeleton of the character (or part objects, joints and motion bone forming the character). The motion processing portion 114 reads out this motion data and plays the motion of the character by moving the respective bones (or part objects) forming the skeleton of the character or by deforming the shape of the skeleton, based on the read motion data.

It is desirable that the motion data stored in the motion-data storage section 176 is prepared by capturing the motion of a real person on which various sensors are mounted. However, the motion data may be generated in real time through a physical simulation (which is a simulation using the physical calculations and which may be a pseudo physical calculation) or a motion blend.

In order to play a realistic motion with less motion data, the motion play may be carried out through the inverse kinematics.

The action control section 116 is designed to set various actions performed by the player. More particularly, when one character (which is controlled by one of the first and second players) performs a first action such as movement or motion and if the other character (which is controlled by the other player) performs a second action at or substantially at the same time, the one character performing the first action may be set more advantageously than the other character in relation to the offensive and defensive battles or game conditions. When the one character performs the second action and if the other character performs a third action at or substantially at the same time, the one character performing the second action may be set more advantageously than the other character in relation to the offensive and defensive battles or game conditions. When the one character performs the third action and if the other character performs the first action at or substantially at the same time, the one character performing the third action may be set more advantageously than the other character in relation to the offensive and defensive battles or game conditions.

In such a case, the first action may be a vertical-attribute attack having its attacking direction (or plane) substantially along a vertical plane (which may be a vertical plane within the object space or a vertical plane in the local coordinate system of the character). The vertical-attribute attack may have its attacking direction ranging at least between +45 degrees and −45 degrees relative to the vertical plane.

The second action may be a horizontal-attribute attack having its attacking direction (or plane) substantially along a horizontal plane (which may be a horizontal plane within the object space or a horizontal plane in the local coordinate system of the character). The horizontal-attribute attack may have its attacking direction ranging at least between +45 degrees and −45 degrees relative to the horizontal plane.

The third action may be a movement action (running or walking action) by which a character moves within the object space in any direction (which is specified by a player through its input control).

The hit check section 118 is designed to check whether or not the attack by the one character hits the other character. In other words, it is checked whether or not when the one character performs an attacking action, its hand, foot or tool hits the body or tool of the other character. If do so, the other character will perform a motion responding to the attack (e.g., break motion, damaged motion or hit motion).

The hit check may be accomplished by pseudo hit areas (simplified objects, hit boxes and hit volumes) which simplify and mimetically represent various shapes of the characters and various orbits taken by the body parts (hands or feet) or tools of the characters.

The image generating section 120 is designed to execute an image processing, generate a game picture and output it toward the display unit 190, based on the results of various processings in the processing unit 100. For example, with generation of a so-called three-dimensional game picture, a geometry processing such as coordinate transformation, clipping, perspective transformation or light-source calculation is first executed. The result thereof is then used to prepare a drawing data including positional coordinates to be added to the vertexes of a primitive face, texture coordinates, color (or brightness) data, normal vector or α-value. Such a drawing data (primitive face data) is then used to draw an image of the geometry-processed object (consisting of one or more primitive faces) in a drawing buffer 174 (which may be one that can store the image information by pixel, such as frame buffer or work buffer). Thus, an image as viewed through a virtual camera (or a given viewpoint) within the object space can be generated.

The sound generating section 130 is designed to execute the sound processing, generate game sounds such as BGMs, effect sounds or voices and output them toward the sound output unit 192, based on the results of various processings in the processing unit 100.

The image generating system of this embodiment may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals (game machines or portable phones) interconnected through a network (transmission lien or communication line) may be used in the present invention.

2. Technique of this Embodiment

A technique of this embodiment will now be described with reference to the drawing. Although the following description mainly relates to a fighting game to which this embodiment is applied, this embodiment may be applied to any of various broad games other than the fighting game.

2.1 Superiority in Offensive and Defensive Battle

The three-dimensional fighting games according to the prior art has decided the superiority in the offensive and defensive battle through a technique mainly used in the two-dimensional fighting games regardless of the three-dimensional games.

Figure 2A:
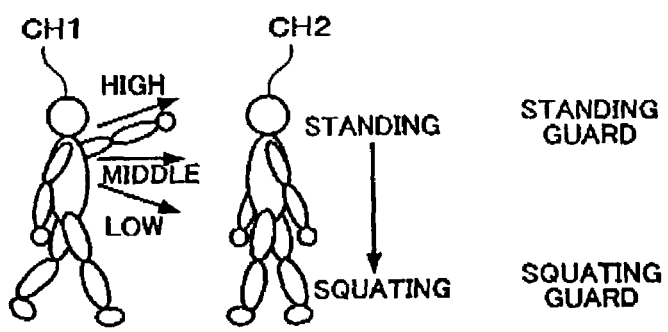
FIGS. 2A and 2B illustrate a prior art technique of determining the superiority on an offensive and defensive battle in a fighting game.

For example, as shown in FIG. 2A, when a character CH1 (which is controlled by a first player and which will similarly be referred to in the following description) attacks another character CH2 (which is controlled by a second player and which will similarly be referred to in the following description), the character CH2 may defend against this attack through a defending action such as squatting, standing guard, squatting guard.

In other words, the character CH2 may defend against the overhead attack by the character CH1 through the standing guard, squatting or squatting guard. The character CH2 may defend against the middle attack by the character CH1 through the standing guard or squatting guard. The character CH2 may defend against the low attack by the character CH1 through the squatting guard.

Figure 2B:
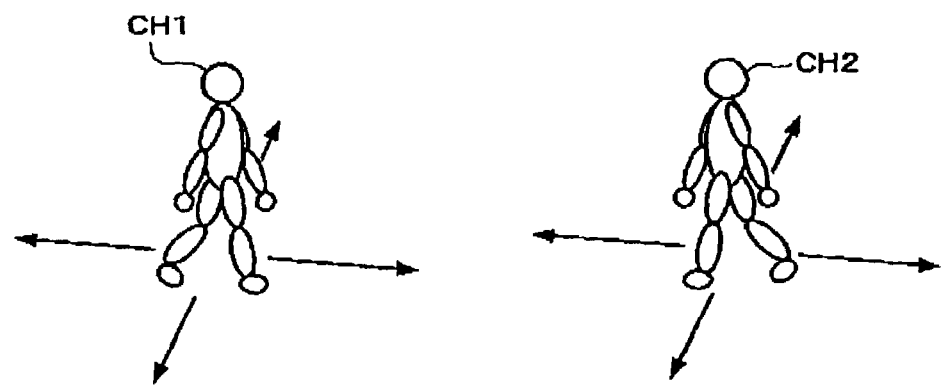

However, such superiority in the offensive and defensive battle has been taken over from the routine of the two-dimensional fighting games and is not ideal for the three-dimensional fighting games. In the three-dimensional fighting games, the characters CH1 and CH2 can freely move around within the object space, as shown in FIG. 2B. It is therefore desirable that the superiority in the offensive and defensive battle can be realized while putting such characteristics of the three-dimensional game to account.

Thus, this embodiment decides the superiority between the character's actions in the offensive and defensive battle through a technique which will be described below.

Figure 3A:
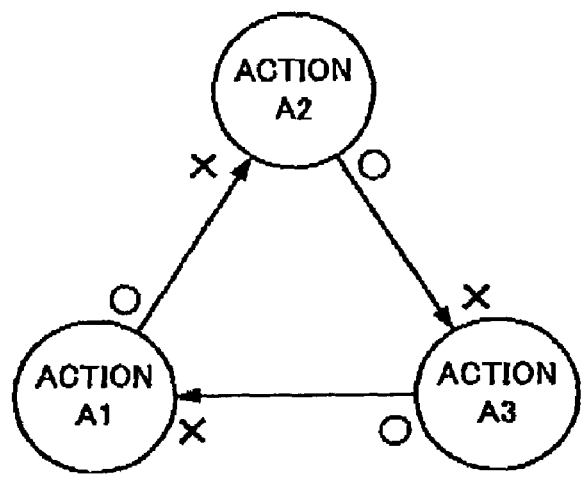
FIGS. 3A and 3B illustrate a technique of determining the superiority on an offensive and defensive battle in a fighting game according to this embodiment.

It is now assumed that the characters can have three actions A1, A2 and A3 as shown in FIG. 3A. For example, when the character CH1 performs the action A1 (first action) and if the character CH2 performs the action A2 (second action) at or substantially at the same time, the character CH1 performing the action A1 may be set more advantageously than the character CH2 and thus win against the character CH2.

When the character CH1 performs the action A2 and if the character CH2 performs the action A3 (third action) at or substantially at the same time, the character CH1 performing the action A2 may be set more advantageously than the character CH2 and thus win against the character CH2.

When the character CH1 performs the action A3 and if the character CH2 performs the action A1 at or substantially at the same time, the character CH1 performing the action A3 may be set more advantageously than the character CH2 and thus win against the character CH2.

In FIG. 3A, thus, the superiority in the offensive and defensive battle is determined through such a triangular relation that the action A1 dominates over the action A2, the action A2 dominates over the action A3 and the action A3 dominates over the action A1.

Therefore, the player controlling its character can grasp which action should be used to win against the enemy immediately as he or she visualizes the triangular relation shown in FIG. 3A. In order words, the player can directly recognize that the action A1 performed by the player dominates over the action A2 performed by the enemy or does not dominate over the action A3 performed by the enemy, as the player visualizes the triangular relation of FIG. 3A. Similarly, the player can directly recognize that the action A2 performed by the player dominates over the action A3 performed by the enemy or does not dominate over the action A1 performed by the enemy and that the action A3 performed by the player dominates over the action A1 performed by the enemy or does not dominate over the action A2 performed by the enemy. In such a manner, the player can obtain a preferred control environment which can easily be understood by the player.

Figure 3B:
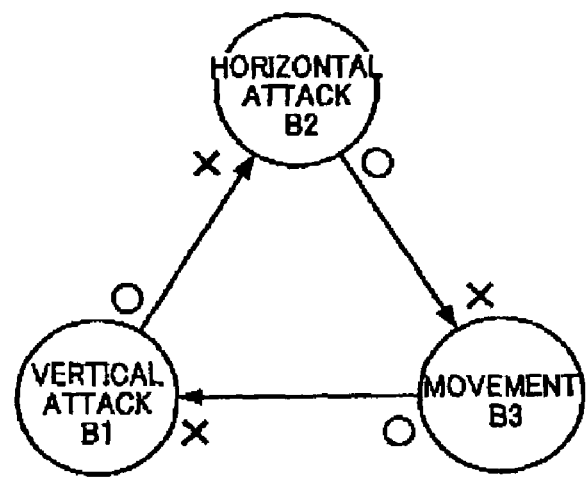

If the game realized by this embodiment is a fighting game using tools such as swords, it is desirable that the three actions A1, A2 and A3 of FIG. 3A are respectively a vertical-attribute attack B1, a horizontal-attribute attack B2 and a movement action B3, as shown in FIG. 3B.

The vertical-attribute attack B1 is an attack which is classified into a longitudinal category (such as longitudinally swinging-down attack) and which is performed in an attacking direction substantially along the vertical plane. In this case, the vertical-attribute attack B1 is not necessarily attained in an attacking direction completely along the vertical plane and may be performed in an attacking direction slightly inclined relative to the vertical plane (at least within the range of angle between +45 degrees and −45 degrees).

The horizontal-attribute attack B2 is an attack which is classified into a horizontal category (such as horizontally swinging-around attack) and which is performed in an attacking direction substantially along the horizontal plane. In this case, the horizontal-attribute attack B2 is not necessarily attained in an attacking direction completely along the horizontal plane and may be performed in an attacking direction slightly inclined relative to the horizontal plane (at least within the range of angle between +45 degrees and −45 degrees).

The movement action is an action by which the characters move within the object space in any direction. Namely, the movement action causes the characters to move in a direction specified by the players through control inputs and may include a running action, walking action and so on.

2.2 Vertical-attribute Attack and Horizontal-attribute Attack

In the offensive and defensive battle of FIG. 3B, the one character performing the vertical-attribute attack is set more advantageously than the other character performing the horizontal-attribute attack.

Figure 4:
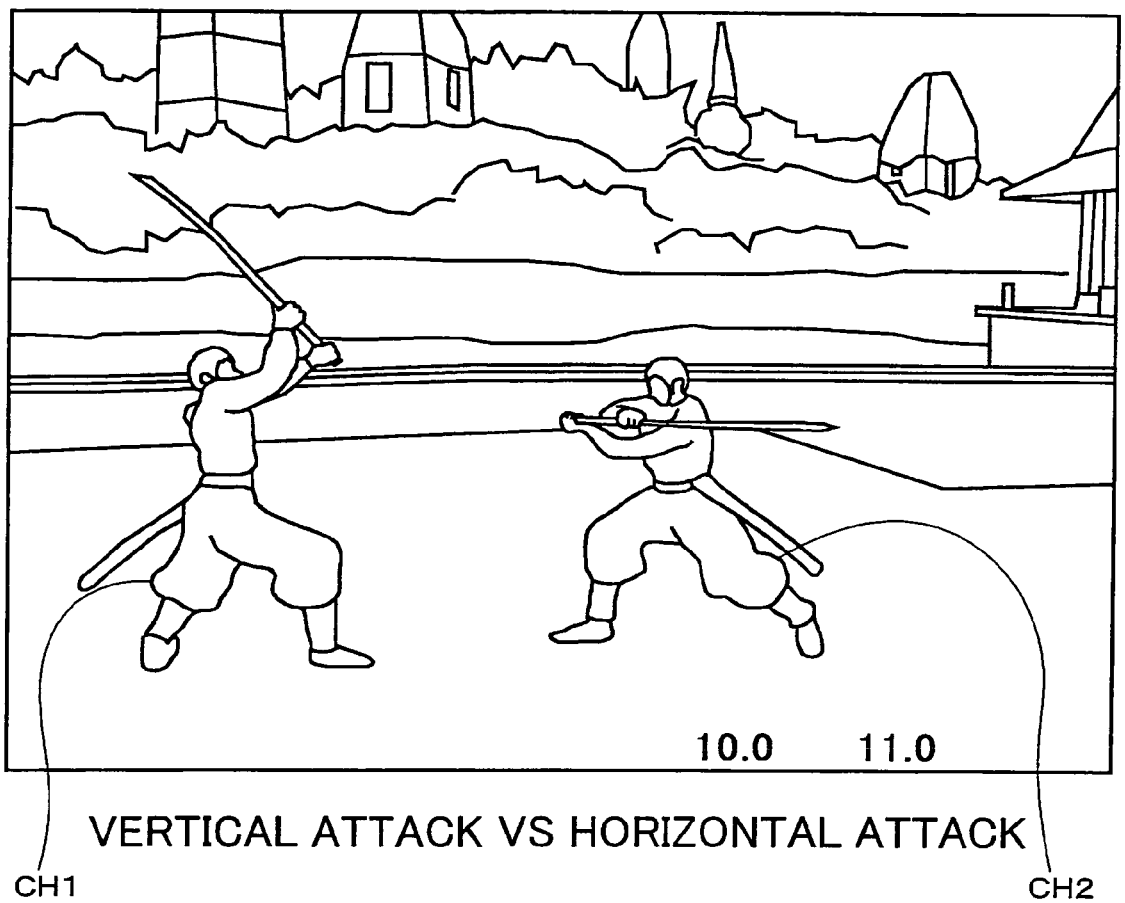
FIG. 4 is a game picture in which a character CH1 performs the vertical-attribute attack while another character CH2 performs the horizontal-attribute attack.

More particularly, FIG. 4 shows that the character CH1 performs the vertical-attribute attack (longitudinally swinging-down attack) while the character CH2 performs the horizontal-attribute attack (horizontally swinging-around attack).

Figure 5:
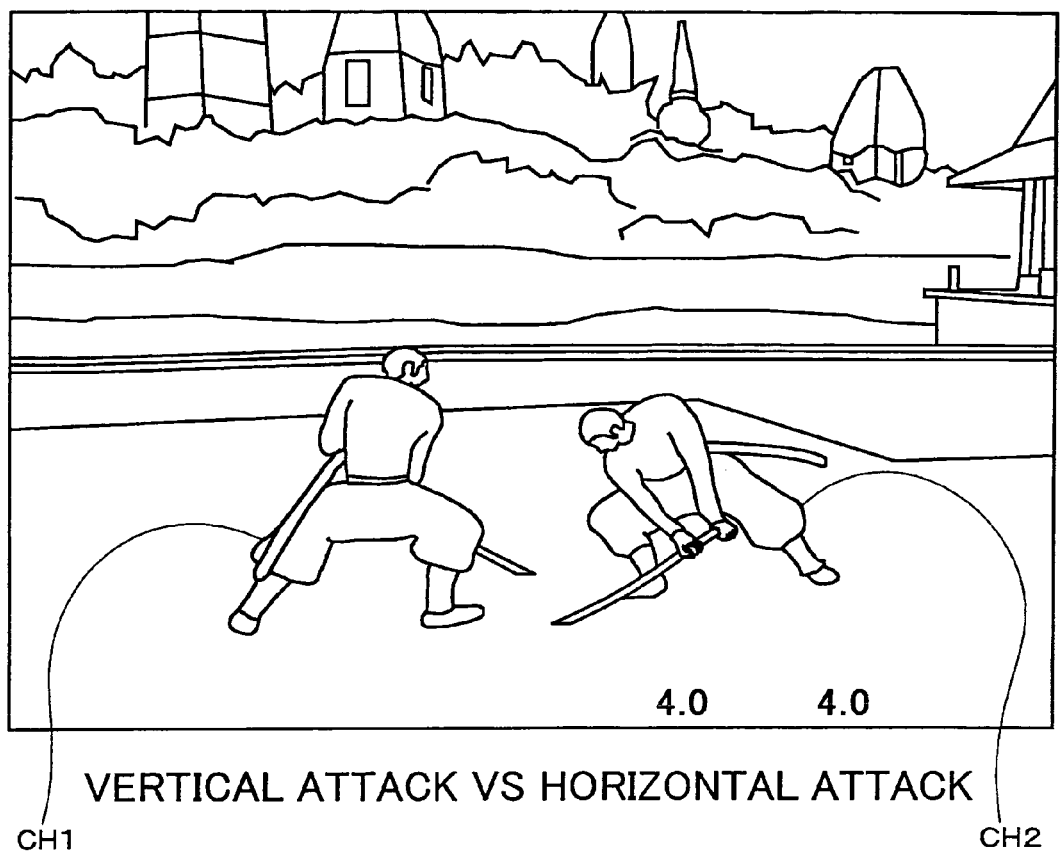
FIG. 5 is a game picture in which the character CH1 performs the vertical-attribute attack while the character CH2 performs the horizontal-attribute attack.
Figure 6:
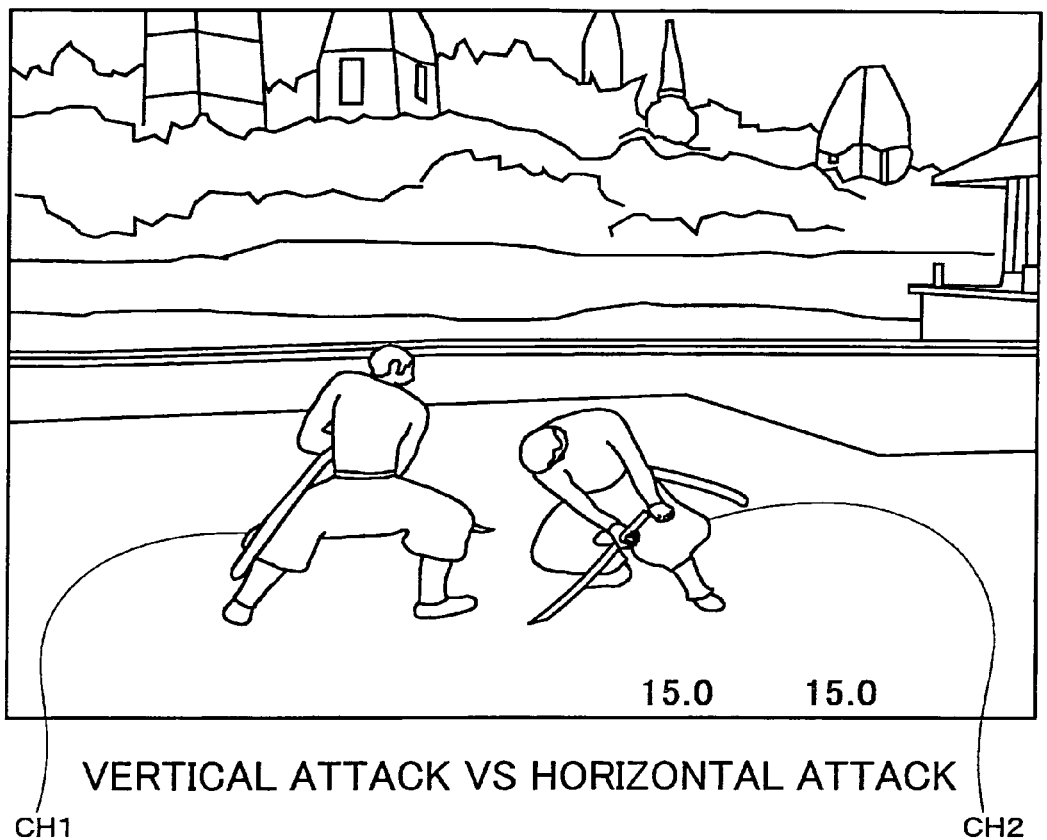
FIG. 6 is a game picture in which the character CH1 performs the vertical-attribute attack while the character CH2 performs the horizontal-attribute attack.

In this case, the character CH1 performing the vertical-attribute attack will be set more advantageously than the character CH2 and win against the character CH2, as shown in FIGS. 5 and 6. The character CH2 attacked by the character CH1 performs a break or damaged motion in which a tool (which in a narrow sense, is a sword) is slapped out of the character CH2's hand. Such a motion is, in a broad sense, an action which represents the attack by the character CH1 performed against the character CH2. The character CH2 attacked by the character CH1 may be placed in its inoperative state for a given time period.

The term "inoperative state" used herein means such a state that any control input from the player controlling the character CH2 will not be received, thus making the character CH2 inoperative for a given time period (which may sometimes be referred to "rigid state").

In the fighting game using tools, the vertical-attribute attack generally provides an increased probability of winning against the horizontal-attribute attack. This is because the character must more move to dodge the horizontal-attribute attack having its horizontally attacking plane (or orbit of sword). On the other hand, the character may slightly move to dodge the vertical-attribute attack having its vertical attacking plane. This raises a problem in that the player more uses the horizontal-attribute attack providing the increased probability of winning, thereby making the development of game unvaried.

To overcome such a problem, this embodiment takes a technique of making the vertical-attribute attack more advantageous when the vertical- and horizontal-attribute attacks are simultaneously performed as shown in FIGS. 4-6. By taking such a technique, the player will not wishfully use the horizontal-attribute attack since the vertical-attribute attack may be more advantageous than the horizontal-attribute attack. As a result, the players will use various types of attacks against each other. This can realize multiple development of game.

It is desirable that the hit check relating to the vertical- and horizontal-attribute attacks is performed depending on whether or not the hit area (hit volume or hit boxes) of the vertical-attribute attack hits the hit area of the horizontal-attribute attack (or whether or not these hit areas overlap or intersect).

In this case, this embodiment uses pseudo hit areas (hit volumes or hit boxes) for the hit check in the vertical- and horizontal-attribute attacks, rather than the normal hit areas.

Figure 7A:
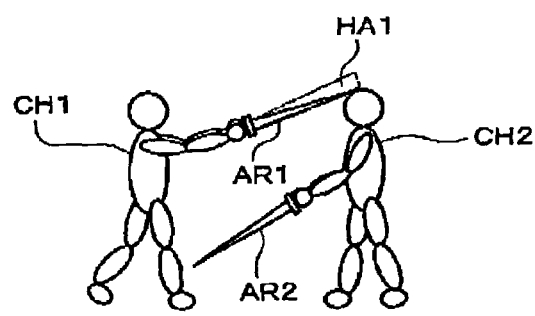

More particularly, as shown in FIG. 7A, the normal hit check forms a fan-shaped hit area HA1, based on the positions of a tool AR1 held by the character CH1 in both the present and previous frames. The hit check is accomplished by judging whether or not this hit area HA1 hits the enemy character CH2.

In this technique, however, it is extremely rare that the tools AR1 and AR2 hit against each other. It is thus difficult to realize the representation of such an image that the tools AR1 and AR2 collide against each other and bounce off each other when the vertical- and horizontal-attribute attacks occur at the same time.

Figure 7B:
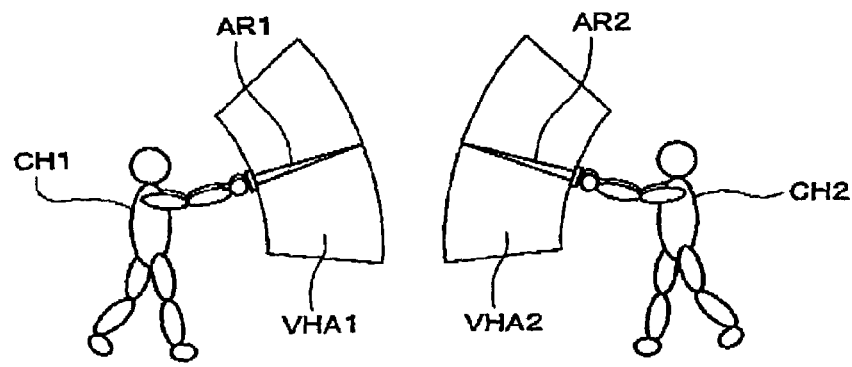

To overcome such a difficulty, this embodiment performs the hit check between the vertical- and horizontal-attribute attacks using such pseudo hit areas (such as hit volumes or hit boxes) VHA1 and VHA2 as shown in FIG. 7B.

These pseudo (approximate) hit areas VHA1 and VHA2 are different from the hit areas HA1 and HA2 which are formed by exactly calculating the orbits of the actual tools AR1 and AR2 as shown in FIG. 7A or which are specified by attacking orbits. The pseudo hit areas VHA1 and VHA2 are larger than the hit areas HA1 and HA2, respectively. In FIG. 7A, for example, each of the pseudo hit areas VHA1 and VHA2 is set by a fan-shaped area which has two opposite sides provided by a line supposed to provide a position whereat the tool AR1 or AR2 is initiated to be swung (or a start position of swinging motion) and another line supposed to provide a position whereat the tool AR1 or AR2 is terminated to be swung (or a terminal position of swinging motion).

In such a manner, these pseudo hit areas VHA1 and VHA2 can be increased in comparison with the hit areas HA1 and HA2 each of which has a size corresponding to only one frame. Thus, the tools AR1 and AR2 will frequently hit against each other in comparison with the case of FIG. 7A. As a result, game pictures in which the tools AR1 and AR2 collide against each other and bounce off out of each other when the vertical- and horizontal-attribute attacks occur at the same time will frequently be generated to improve the stage effect in the game pictures.

Figure 7C:
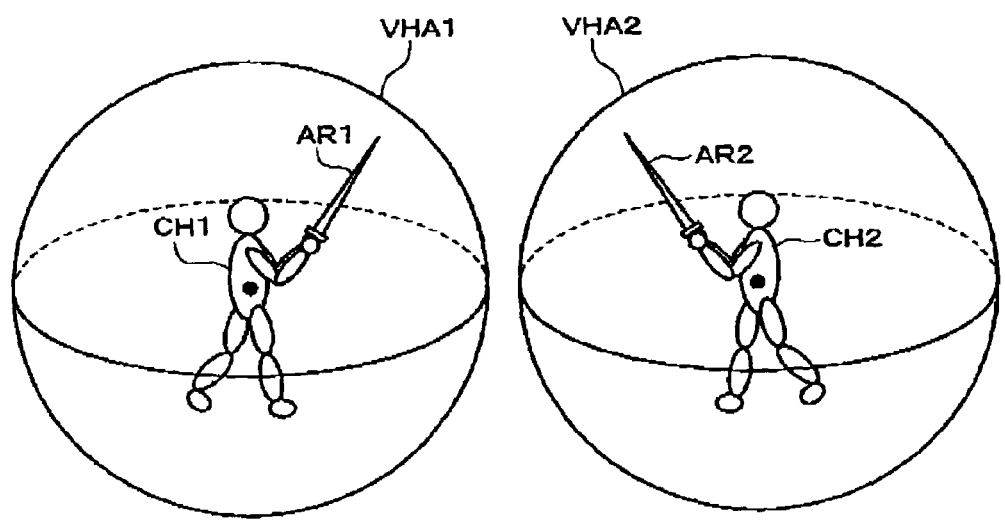

The pseudo hit areas VHA1 and VHA2 may have any of various other forms. As shown in FIG. 7C, for example, each of the pseudo hit areas VHA1 and VHA2 may be of cubical configuration (e.g., sphere, cylinder or square column) which contains the character CH1 or CH2 and the tool AR1 or AR2. Alternatively, each of the pseudo hit areas VHA1 and VHA2 may be cubical configuration (e.g., sphere, cylinder or square column) which contains the tool AR1 or AR2 or its orbit.

By variably controlling the sizes of the pseudo hit areas, the frequency in which the vertical- and horizontal-attribute attacks hit against each other may be regulated.

Figure 8:
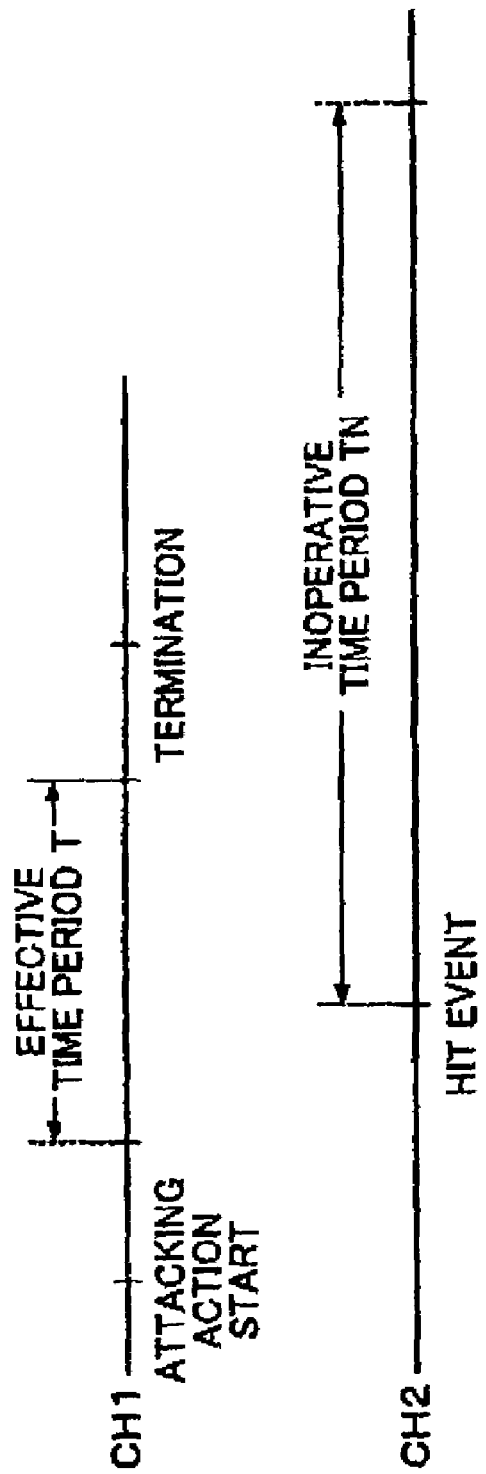
FIG. 8 illustrates an effective attacking time and an inoperable time of character.

Timing at which the vertical- and horizontal-attribute attacks hit against each other can be determined by such a technique as shown in FIG. 8. There is set a period T in which the attack becomes effective (or hit period) until the attack action (or attack motion) of the character CH1 starts and then terminates. If it is judged that the pseudo hit areas VHA1 and VHA2 hit against each other during this attack effective period T, it is then judged that the hit event between vertical- and horizontal-attribute attacks occurs. If the character CH2 is set to be placed in its inoperative (or rigid) state during a period TN counted from the occurrence of the hit event, the character CH1 can be set more advantageously than the character CH2.

2.3 Horizontal-attribute Attack and Movement Action

As shown in FIG. 3B, this embodiment is designed to set one of the characters more advantageously than the other character when the one character performs the horizontal-attribute attack against the other character and if the other character performs the movement action (or running action) against the horizontal-attribute attack by the one character.

Figure 9:
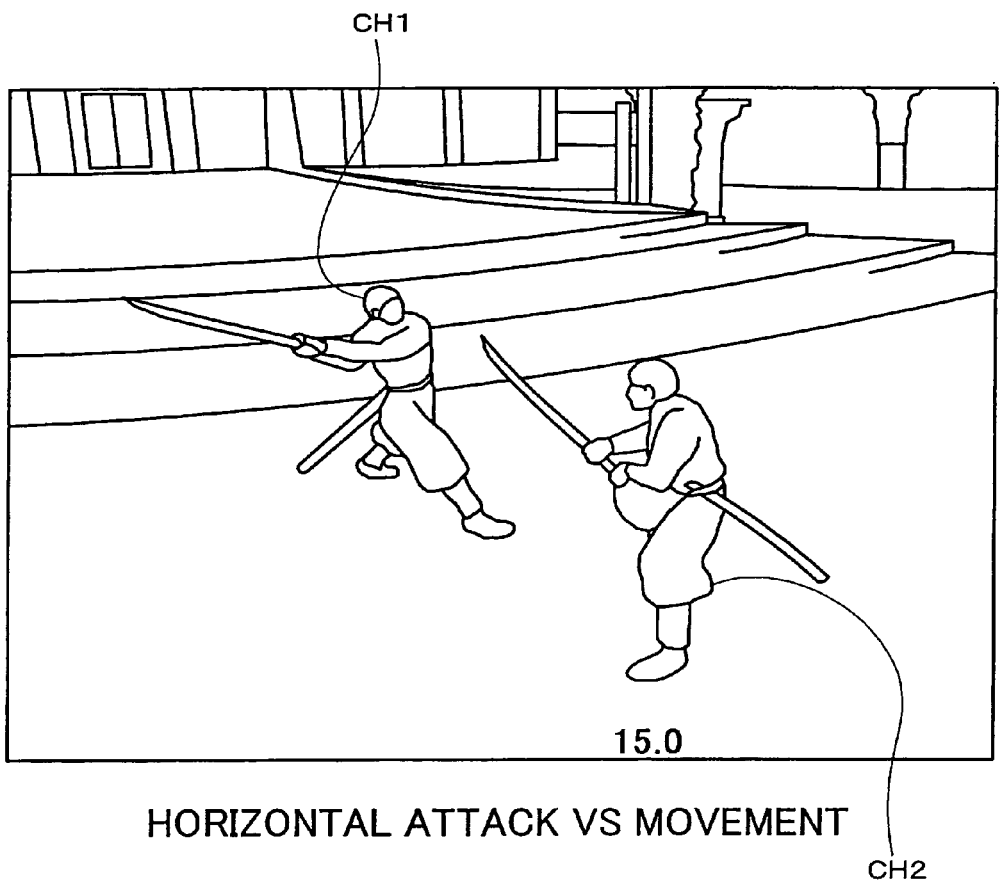
FIG. 9 is a game picture in which the character CH1 performs the horizontal-attribute attack while the character CH2 performs a moving action.

More particularly, FIG. 9 shows that the character CH1 performs the horizontal-attribute attack (or horizontally swinging-around attack) while the character CH2 performs the movement action at or substantially at the same time.

Figure 10:
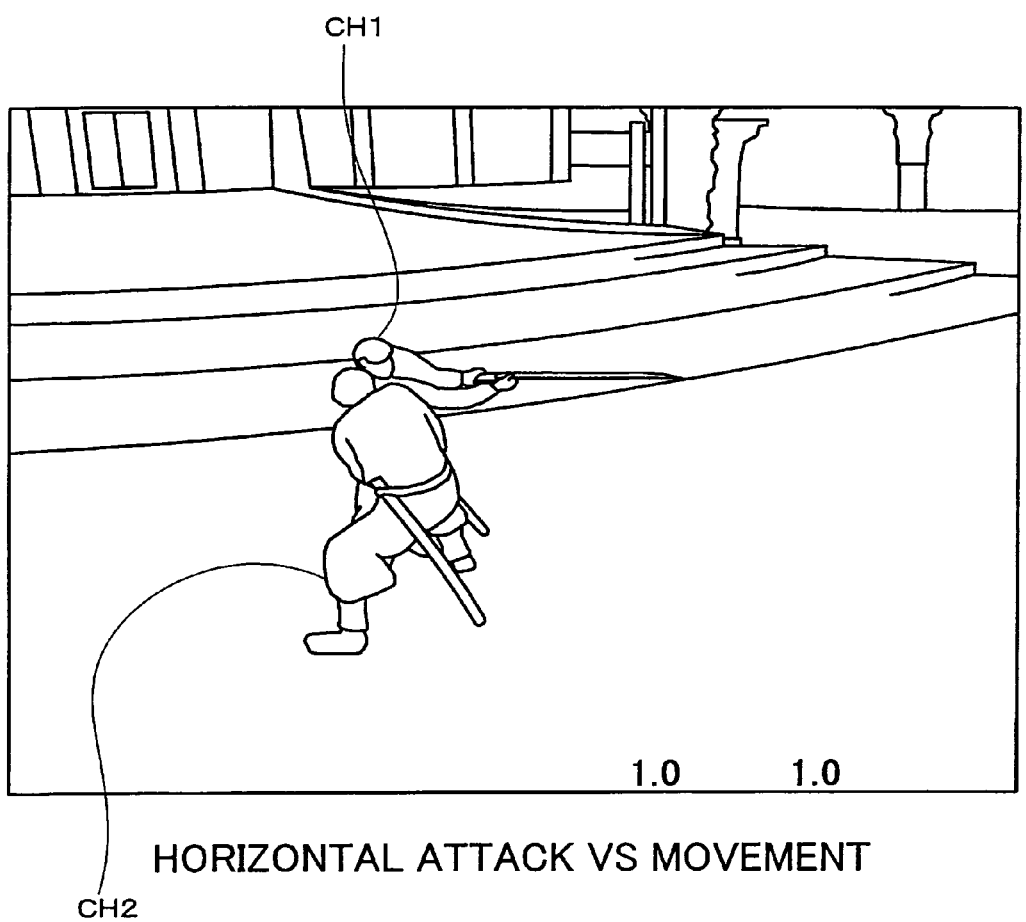
FIG. 10 is a game picture in which the character CH1 performs the horizontal-attribute attack while the character CH2 performs a moving action.
Figure 11:
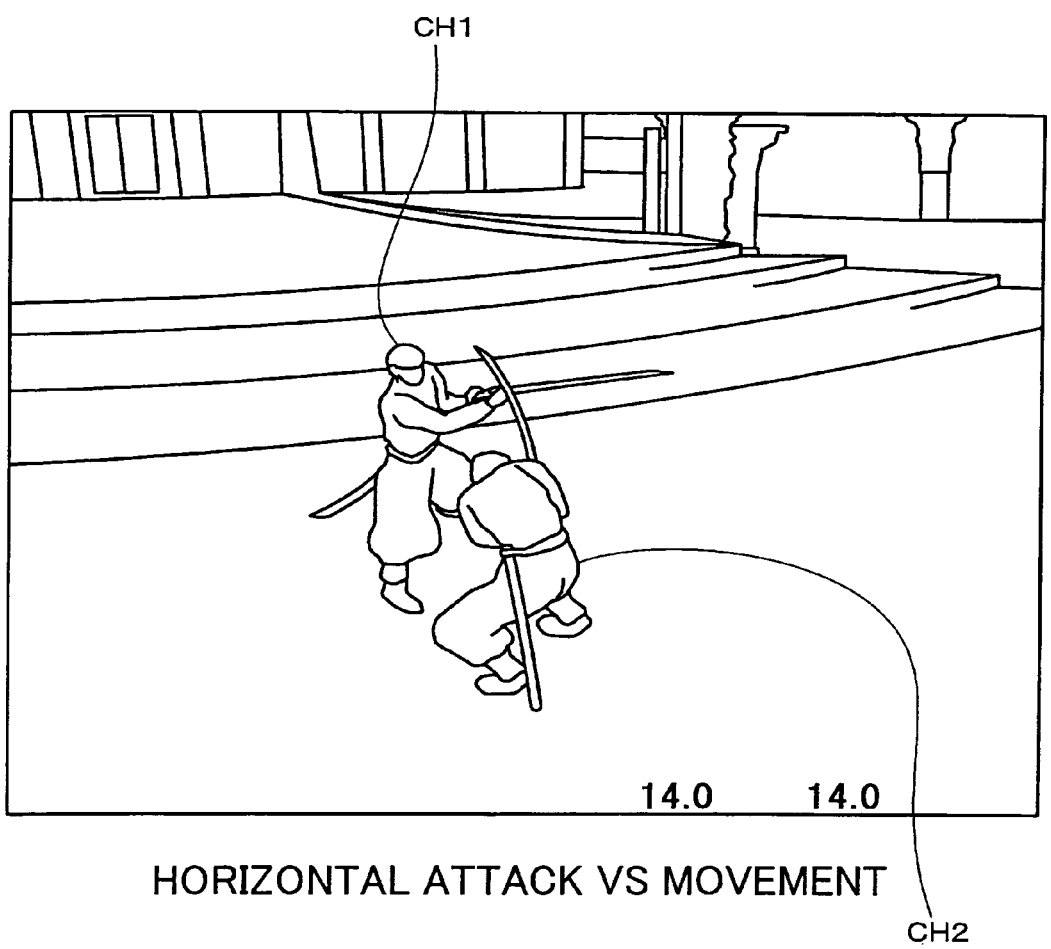
FIG. 11 is a game picture in which the character CH1 performs the horizontal-attribute attack while the character CH2 performs a moving action.

In such a case, the character CH1 performing the horizontal-attribute attack will be set more advantageously than the character CH2 and win against the character CH2, as shown in FIGS. 10 and 11. More particularly, the horizontal-attribute attack by the character CH1 hits the character CH2 which is in turn placed in the damaged motion. Furthermore, the character CH2 is set to be in its inoperative state for a given time period.

Thus, when the character is attacked by the horizontal-attribute attack having its horizontal attacking plane, it will hardly avoid the horizontal-attribute attack even if the character moves. This can represent that the horizontal-attribute attack is stronger than the movement action. Therefore, a more realistic and natural game picture which can be accepted by the players can be generated.

In this case, however, this embodiment set an increased amount of axis following compensation relative to the character CH1 performing the horizontal-attribute attack.

The term "axis following compensation" used herein is intended to mean a compensation for orienting the direction DC1 taken by the character CH1 toward the direction D12 taken by the enemy character CH2. As this amount of axis following compensation is increased, the degree with which the direction DC1 of the character CH1 follows the direction D12 of the character CH2 is also increased. This increases the degree with which the attack by the character CH1 hits the character CH2. The amount of axis following compensation is determined by an angular velocity at which the direction DC1 is oriented toward the direction D12 in each frame and the number of frames through which the axis following compensation is carried out (e.g., the time period through which the axis following compensation is made).

This embodiment sets the amount of axis following compensation for the character CH1 performing the horizontal-attribute attack at a level larger than that of any other attack action (e.g., vertical-attribute attack). Therefore, the direction DC1 taken by the character CH1 performing the horizontal-attribute attack can more easily follow the direction D12 of the character CH2. As a result, the attack by the character CH1 will more easily hit the character CH2, thereby making the character CH1 more advantageous than the character CH2.

2.4 Movement Action and Vertical-attribute Attack

As shown in FIG. 3B, this embodiment is designed to set the one character more advantageously than the other character when the other character performs the vertical-attribute attack and if the one character performs the movement action.

Figure 13:
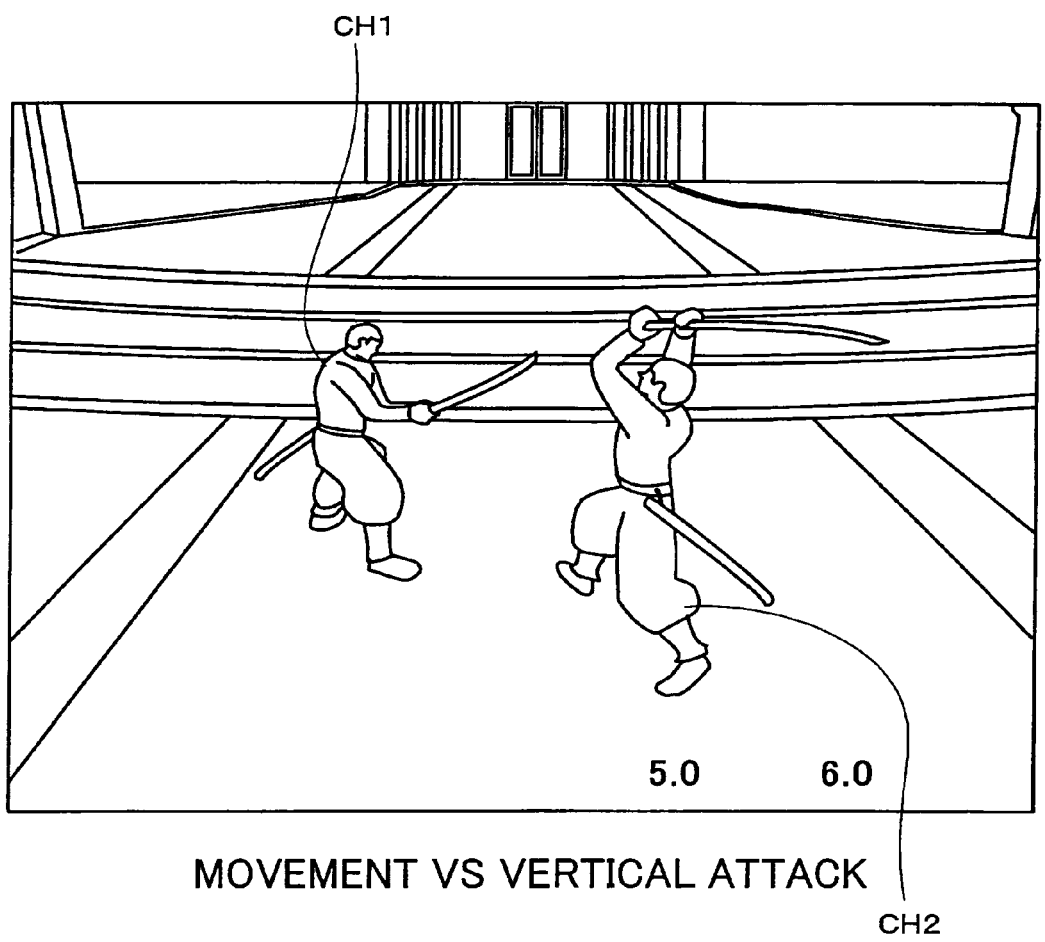
FIG. 13 is a game picture in which the character CH1 performs the moving action while the character CH2 performs the vertical-attribute attack.

More particularly, FIG. 13 shows that the character CH2 performs the vertical-attribute attack (or longitudinally swinging-down attack) while the character CH1 performs the movement action (or escaping action) at or substantially at the same time.

Figure 14:
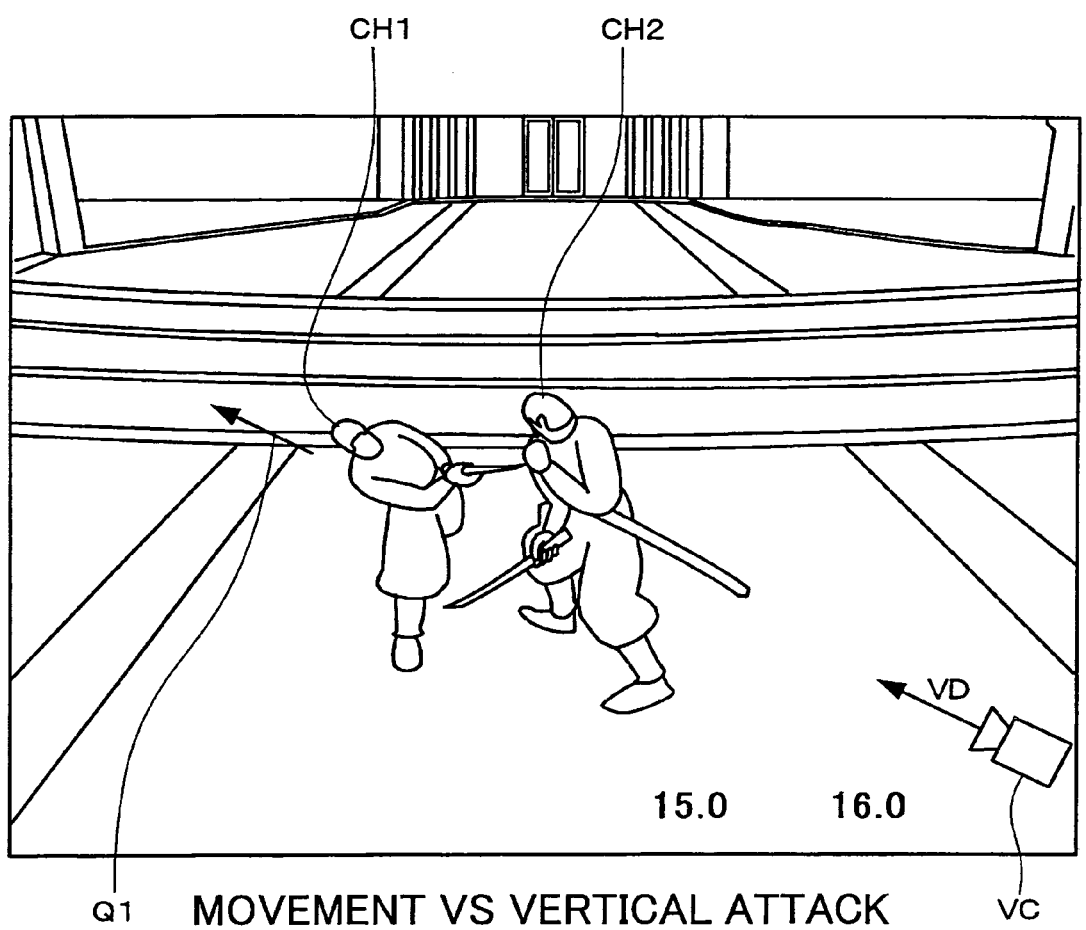
FIG. 14 is a game picture in which the character CH1 performs the moving action while the character CH2 performs the vertical-attribute attack.
Figure 15:
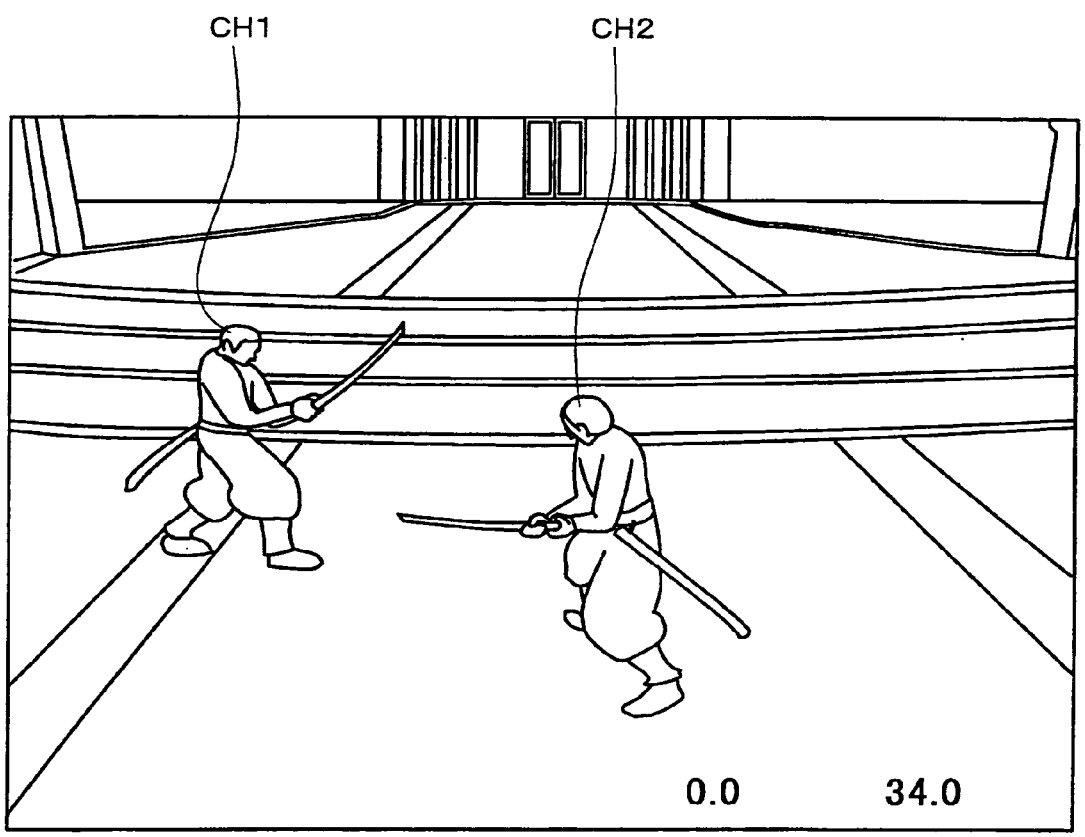
FIG. 15 is a game picture in which the character CH1 performs the moving action while the character CH2 performs the vertical-attribute attack.

In this case, the character CH1 performing the movement action will be set more advantageously than the character CH2 and win against the character CH2, as shown in FIGS. 14 and 15. In other words, even though the character CH2 performs the vertical-attribute attack, the character CH1 can well dodge and escape from the vertical-attribute attack by the character CH2.

In such a manner, it can be represented that the movement action is stronger than the vertical-attribute attack since the character can escape from the vertical-attribute attack having its vertical attack plane merely by slightly shifting the body of the character. This can generate a more realistic and natural game picture which can be accepted by the players.

Figure 16A:
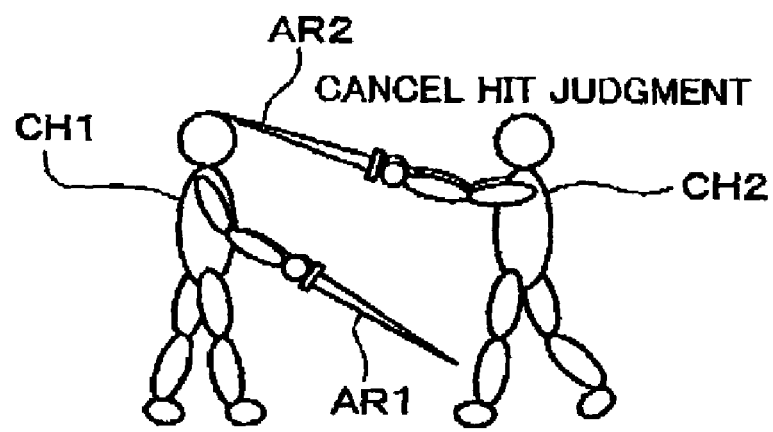
FIGS. 16A and 16B illustrate a technique of canceling the hit-judgment.

In such a case, however, this embodiment is designed to cancel the judgment of hit even though it is judged that the vertical-attribute attack by the character CH2 hits the character CH1, as shown in FIG. 16A.

For example, the hit check for the vertical-attribute attack by the character CH2 may be carried out using such a hit area as shown in FIG. 7A. More particularly, if the hit area of the tool AR2 of the character CH2 shown in FIG. 16a hits (or overlaps or intersects) the character CH1, the hit of attack is judged.

However, this judgment of hit is canceled when the character CH2 performs the vertical-attribute attack and if the character CH1 performs the movement action at or substantially at the same time. Thus, the character CH1 can be set more advantageously than the character CH2.

If the judgment of hit relating to the vertical-attribute attack by the character CH2 is merely canceled, it may occur that there is no judgment of hit in spite of the fact that the tool AR2 of the character CH2 penetrates the body of the character CH1. This provides artificiality to the players. In this case, therefore, this embodiment causes the character CH1 to perform an action (or motion) in which the upper half of the character CH1's body is only shifted in the lateral direction, as shown in FIG. 14. As a result, such a situation that the players feel the artificiality can be avoided.

Alternatively, the judgment of hit may be canceled only when the character CH1 is located out of a range of angle including the direction DC2 taken by the character CH2 (or a range of angle between a first plus angle and a second minus angle on the basis of the direction DC2).

For example, if the judgment of hit relating to the vertical-attribute attack by the character CH2 is canceled in spite of the fact that the character CH1 is located just in front of the character CH2, this will generate a very artificial game picture.

Figure 16B:
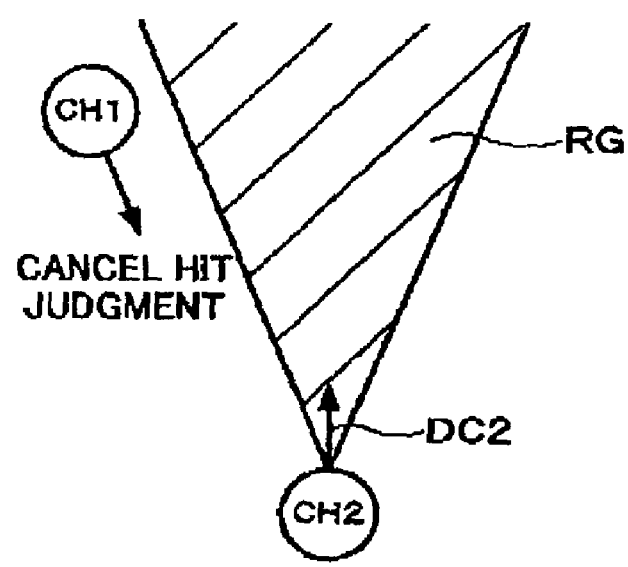
Figure 17A:
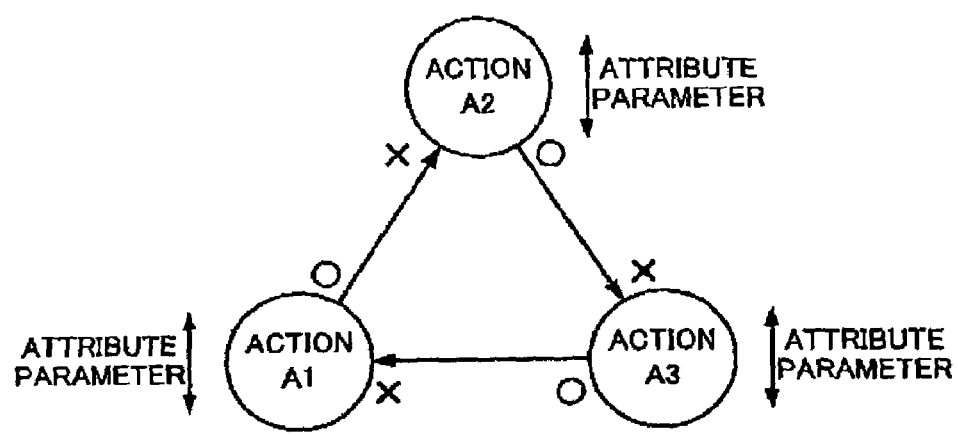
FIGS. 17A and 17B illustrate a technique of regulating attribute parameters in connection with one another.
Figure 17B:
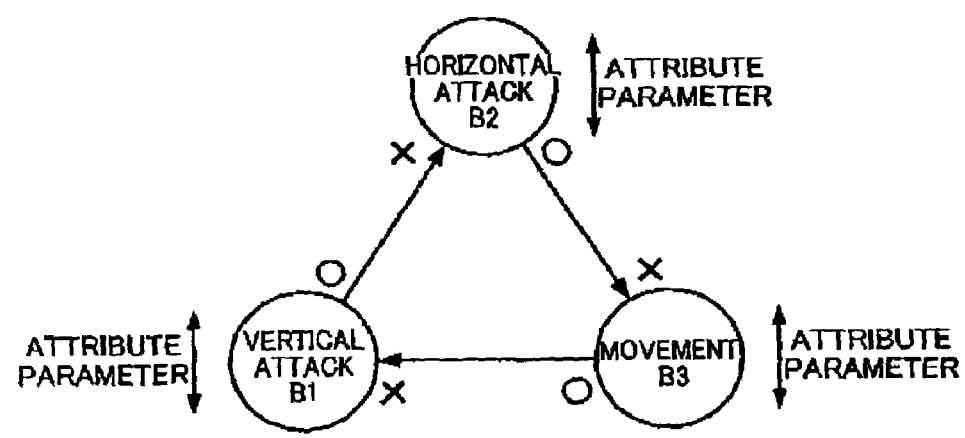

On the contrary, the technique of FIG. 16B does not cancel the judgment of hit since it is judged that the character CH1 is located within a range of angle (or a range of direction) RG when the character CH1 is located just in the front of the character CH2.

On the other hand, when the character CH1 is located at a position shifted from the character CH2 rather than just in front of the character CH2, the technique of FIG. 16B cancels the judgment of hit. In such a case, the players will not feel the artificiality since the character CH1 is viewed as if it could escape from the attack by the character CH2 in extremis. Therefore, the character CH1 can be set more advantageously than the character CH2 while generating a game picture by which the players will not feel any artificiality.

If such a game picture in which the vertical-attribute attack by the other character is viewed as if it hits the one character is generated in spite of the fact that the judgment of hit has been canceled as in FIG. 14, the players will feel an inconsistency.

To overcome such a problem, it is desirable that if the judgment of hit is canceled as shown in FIG. 14, the position or direction (VD) of an virtual camera VC is changed such that the virtual camera VC cannot see a hit location (or part) of the character CH1.

More particularly, the position or direction of the virtual camera VC is so set that the hit location of the character CH1 is hidden behind the character CH2. In such a case, the position or direction of the virtual camera may be changed depending on the positional relationship between the characters CH1, CH2. In addition, the position or direction of the virtual camera VC maybe set such that any object other than the character CH2 (e.g., effect object such as a spray of blood or other object such as a building or wall) hides the hit location of the character CH1.

If a game picture in which the vertical-attribute attack is viewed as if it hits the enemy character in spite of the fact that the judgment of hit has been canceled is displayed on generation of a replay game picture, the players will feel a further artificiality.

To avoid such a situation, it is thus desirable that when the judgment of hit has been canceled, a compensated game picture in which the vertical-attribute attack by the other character is viewed as if it does not hit the one character is generated on generation of the replay game picture.

More particularly, the coordinates of the character CH1, character CH2 and virtual camera VC (e.g., absolute coordinates in the world coordinate system) and so on have been stored in the storage section as replay information for generating the replay game picture. Hit cancel flag (or information indicating the cancel of the hit judgment) has also been stored as replay information. On replay, the compensated image is generated based on the stored coordinates and hit cancel flag. More particularly, the stored coordinates (absolute coordinates) of the character CH2 are compensated to be shifted as shown by Q1 in FIG. 14. Thus, a compensated replay picture will be generated. In such a manner, there can be avoided such a situation that on replay, the players know that the judgment of hit has actually been canceled in spite of the fact that the attack has actually hit.

2.5 Adjustment of Attribute Parameter

When the superiority in the offensive and defensive battle is set as shown in FIGS. 3A and 3B, it is important that an attribute parameter relating to the offensive and defensive battle (e.g., difficulty level setting parameter or handicap setting parameter) is adjusted.

For example, if the attribute parameter relating to the action A1 shown in FIG. 3A is changed, the superiority in the offensive and defensive battle may be unbalanced unless the attribute parameters of the actions A2 and A3 are also changed.

For such a purpose, this embodiment is designed such that if the attribute parameter (which influences the balance of the superiority in the offensive and defensive battle) relating to any one of the first, second and third actions (i.e., vertical-attribute attack, horizontal-attribute attack and movement action) is changed. The attribute parameters relating to the remaining actions are also changed.

Explaining the size of a pseudo hit area, which is one of the attribute parameters, as described in connection with FIGS. 7B and 7C, a pseudo hit area relating to one of the actions (e.g., vertical-attribute attack) is increased or decreased while a pseudo hit area relating to another action (e.g., horizontal-attribute attack) is also increased or decreased at the same time.

Further explaining the attack effective or inoperative time period, which is also one of the attribute parameters, as described in connection with FIG. 8, the attack effective or inoperative time period relating to one of the actions (e.g., vertical-attribute attack) is prolonged or shortened while the attack effective or inoperative time period relating to another action (e.g., horizontal-attribute attack) is also prolonged or shortened at the same time.

Further explaining the amount of axis following compensation, which is also one of the attribute parameters, as described in connection with FIGS. 12A and 12B, the amount of axis following compensation relating to one of the actions (attack or movement) is increased or decreased while the amount of axis following compensation relating to another action (attack or movement) is also increased or decreased at the same time.

Further explaining the range of angle RG, which is also one of the attribute parameters, as described in connection with FIG. 16B, the range of angle relating to one of the actions (attack or movement) is widened or narrowed while the range of angle relating to another action (attack or movement) is also widened or narrowed at the same time.

By adjusting the attribute parameters in the above manner, the balance adjustment in various games can be realized while maintaining the balance of the superiority in the offensive and defensive battle.

3. Processings in this Embodiment

The details of the processings in this embodiment will be described in connection with flowcharts shown in FIGS. 18, 19 and 20.

FIG. 18 is a flowchart illustrating a processing of knock off the horizontal-attribute attack by the enemy with the vertical-attribute attack (see FIGS. 4-8).

First of all, a player's input is accepted and the action of its own character is set through the control input (step S1).

It is then judged whether or not the attacking flag of the player's character is ON (attacking) (step S2). If not so, the procedure moves to the usual hit checking (step S9). If the attacking flag is ON, it is judged whether or not the attack by the player's character is the vertical-attribute attack (step S3). If not so, the procedure moves to the usual hit checking.

If the attack by the player's character is the vertical-attribute attack, it is then judged whether or not the vertical-attribute attack is within the effective time period (step S4 and see FIG. 8). If not so, the procedure moves to the usual hit checking. If the vertical-attribute attack is within the effective time period, it is then judged whether or not the enemy character is performing the horizontal-attribute attack (step S5). If the enemy character is not performing the horizontal-attribute attack, the procedure moves to the usual hit checking.

If the enemy character is performing the horizontal-attribute attack, it is then judged whether or not the pseudo hit area for the vertical-attribute attack by the player's character hits the pseudo hit area for the horizontal-attribute attack by the enemy character (step S6 and see FIGS. 7B and 7C). If not so, the procedure moves to the usual hit checking. If it is judged that the pseudo hit area for the vertical-attribute attack by the player's character hits the pseudo hit area for the horizontal-attribute attack by the enemy character, the attacking flags of the player's character and enemy character are cleared such that the usual hit checking will not wastefully be executed (step S7). In addition, the action of the enemy character is set in the break motion (in which the horizontal-attribute attack is knocked off) while at the same time the enemy character is set to be inoperative for a given time period (step S8 and see FIGS. 5, 6 and 8). Thereafter, the procedure moved to the usual hit checking.

In such a manner, this embodiment is designed that when one of the characters performs the vertical-attribute attack and if the other character performs the horizontal-attribute attack (within the effective attacking period), the hit checking is performed based on such pseudo hit areas VHA1 and VHA2 (or first and second pseudo hit areas) as shown in FIGS. 7B and 7C (step S6). In such a case, the attacking flags are cleared (step S7). Thus, the usual hit checking step (step S9) will not perform any hit check based on such hit areas HA1 and HA2 (or first and second hit areas) as shown in FIG. 7A. If the hit check of the step S6 based on the pseudo hit areas VHA1 and VHA2 is not performed (or if a condition under which the vertical- and horizontal-attribute attacks occur at the same time is not fulfilled), the hit checking process based on the hit areas HA1 and HA2 will be performed in the usual hit checking process of the step S9.

Figure 19:
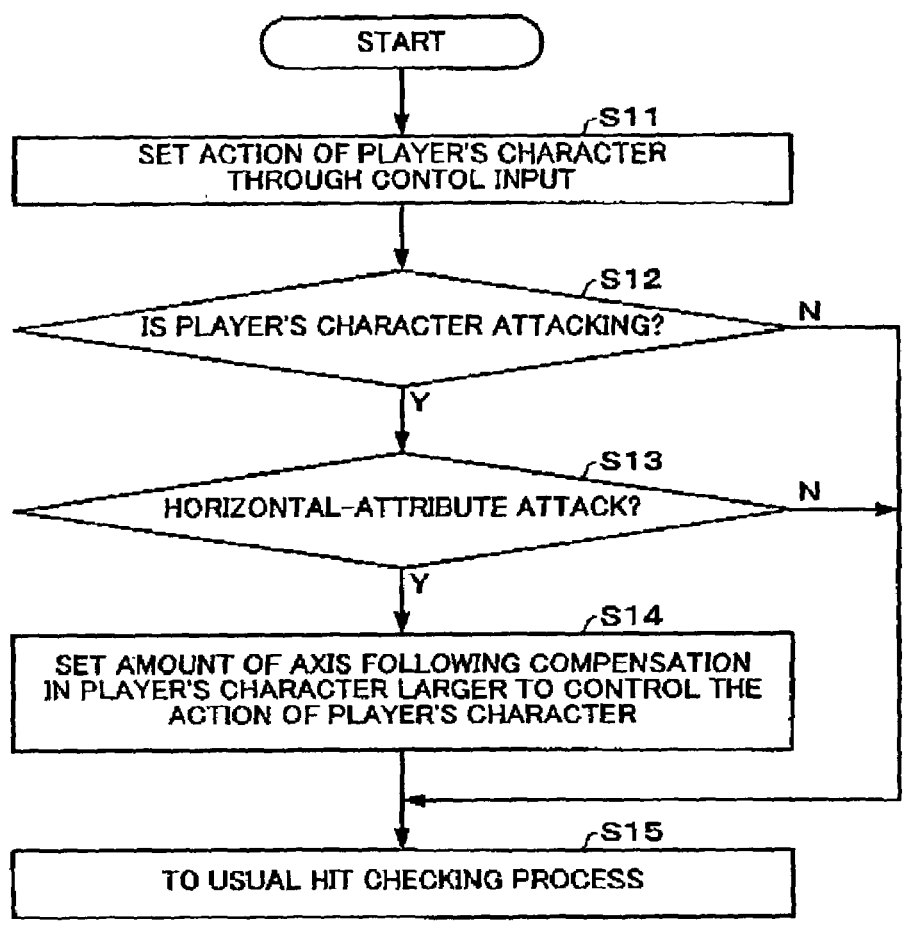
FIG. 19 is a flowchart illustrating the details of a process according to this embodiment.

FIG. 19 is a flowchart illustrating a processing of effectively applying the horizontal-attribute attack to the movement action of the enemy character (see FIGS. 9-12B).

First of all, a player sets the action of its own character through a control input (step S11).

It is then judged whether or not the player's character is attacking (step S12). If not so, the procedure moves to the usual hit checking (step S15). If the player's character is attacking, it is then judged whether or not the attack by the player's character is the horizontal-attribute attack (step S13). If not so, the procedure moves to the usual hit checking.

Figure 12A:
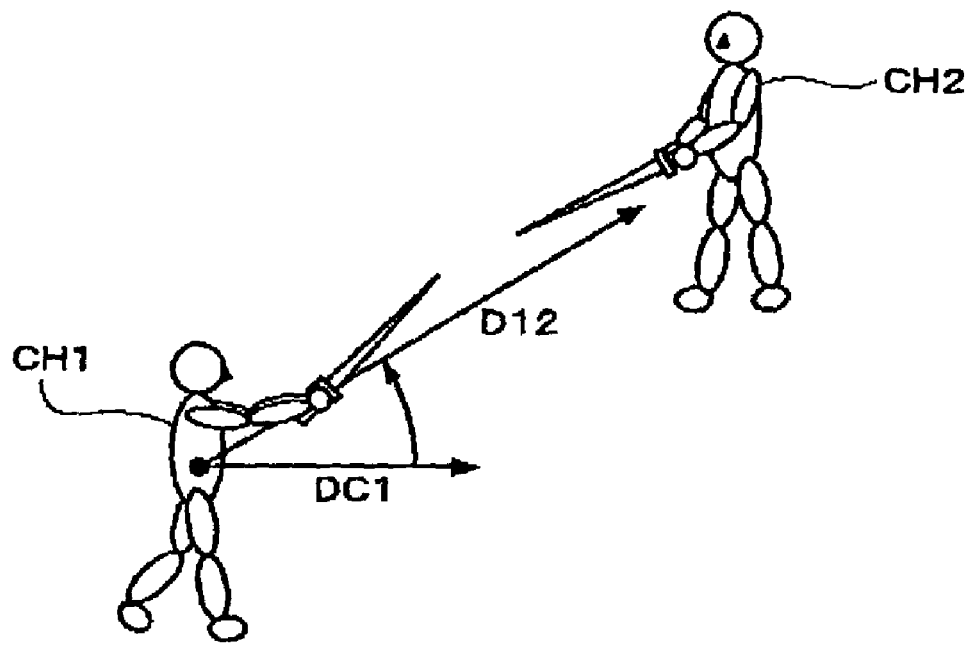
FIGS. 12A and 12B illustrate an axis-following compensation.
Figure 12B:
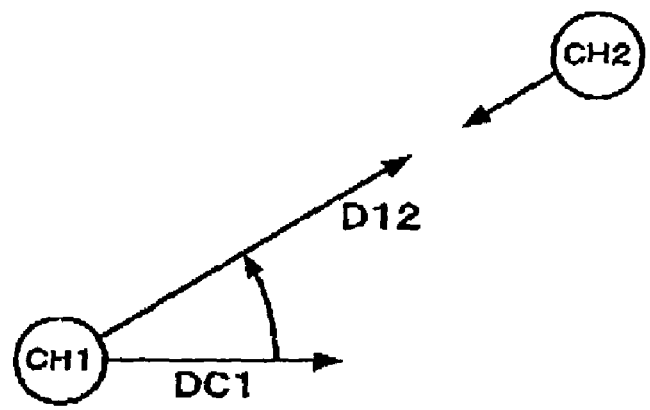

If the attack by the player's character is the horizontal-attribute attack, the amount of axis following compensation in the player's character is set to be larger for controlling the action of the player's character (step S14 and see FIGS. 12A and 12B). Thereafter, the procedure moved to the usual hit checking.

Figure 20:
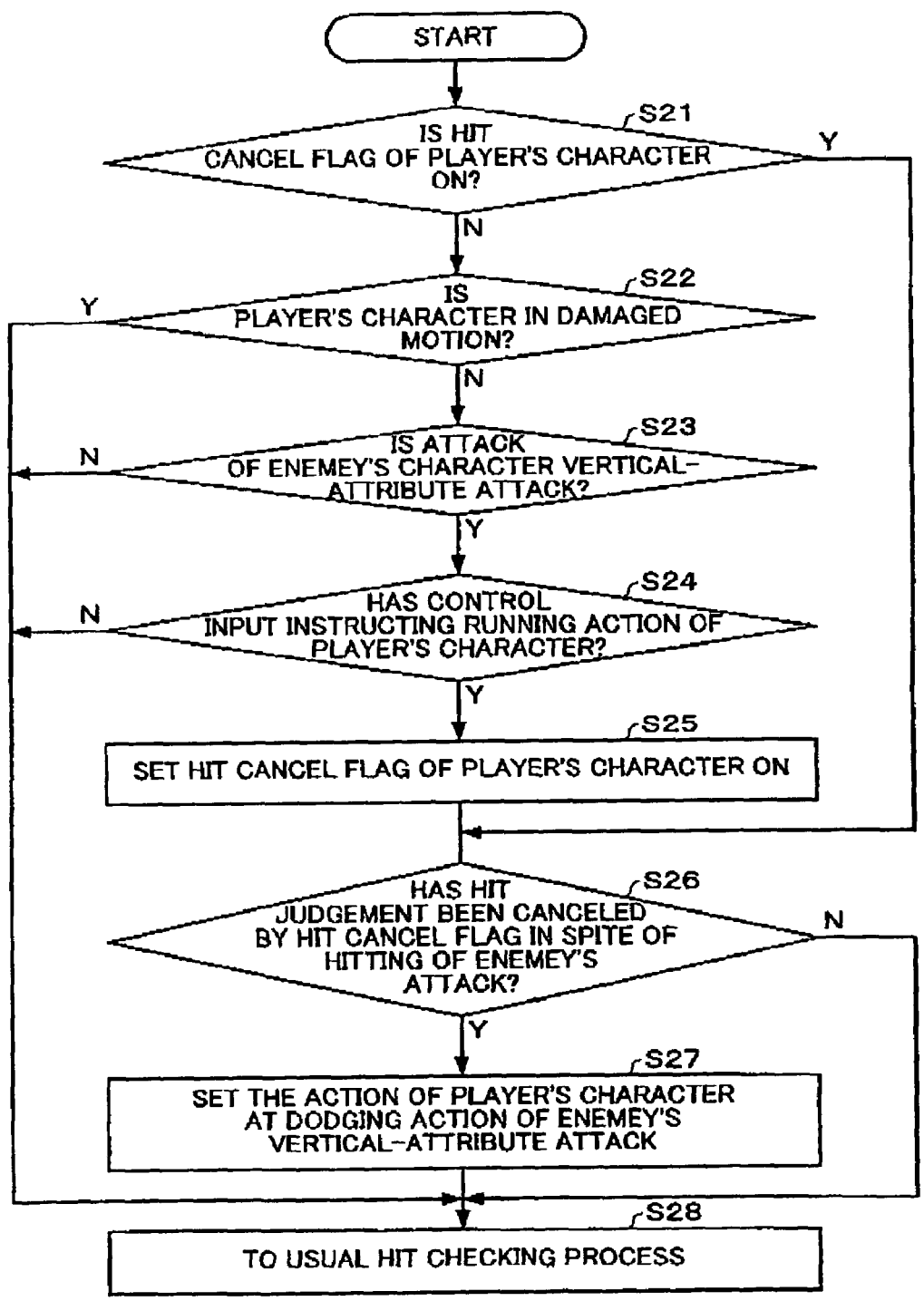
FIG. 20 is a flowchart illustrating the details of a process according to this embodiment.

FIG. 20 is a flowchart illustrating a process of escaping the vertical-attribute attack by the enemy character through the movement action (FIGS. 13-16B).

It is first judged whether or not the hit cancel flag of the player's character is ON (step S21). If ON, the procedure moves to step S26. If not ON, it is then judged whether or not the player's character is during the damaged motion (step S22). If during the damaged motion, the procedure moves to the usual hit checking (step S28).

If the player's character is not during the damaged motion, it is then judged whether or not the attack by the enemy character is the vertical-attribute attack (step S23). If not so, the procedure moves to the usual hit checking. If the attack by the enemy character is the vertical-attribute attack, it is then judged whether or not there is a control input instructing the running action of the player's character (step S24). If not so, the procedure moves to the usual hit checking.

If the running action is instructed, the hit cancel flag of the player's character is set to be ON (step S25).

It is then judged whether or not the judgment of hit is canceled by the hit cancel flag in spite of the fact that the enemy's attack hits (step S26 and see FIGS. 16A and 16B). If canceled, the action of the player's character is set to be the dodging action from the vertical-attribute attack by the enemy (step S27 and see FIGS. 14 and 15). Thereafter, the procedure moves to the usual hit checking.

4. Hardware Configuration

Figure 21:
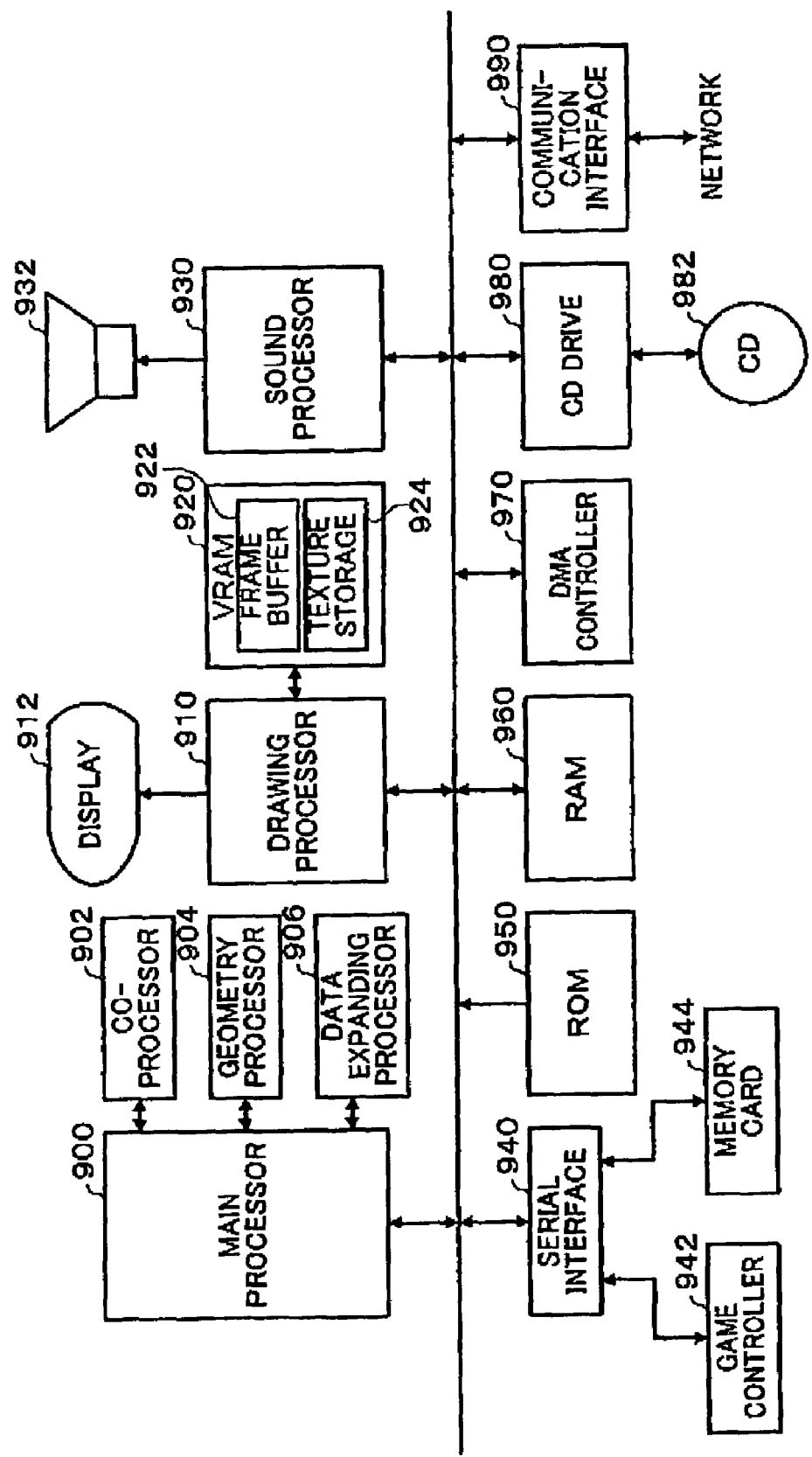
FIG. 21 illustrates a hardware structure which can realize this embodiment.

A hardware arrangement which can realize this embodiment will be described with reference to FIG. 21.

A main processor 900 operates to execute various processings such as game processing, image processing, sound processing and other processings according to a program stored in a CD (information storage medium) 982, a program transferred through a communication interface 990 or a program stored in a ROM (information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, the program running on the main processor 900 instructs (or asks) that processing to the coprocessor 902.

A geometry processor 904 is to perform a geometry processing such as coordinate transformation, perspective transformation, light source calculation, curve formation or the like and has a product-sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expanding processor 906 is to perform a decoding process for expanding image and sound compressed data or a process for accelerating the decoding process in the main processor 900. In the opening, intermission, ending or game scene, thus, an MPEG compressed animation maybe displayed. The image and sound data to be decoded may be stored in the storage devices including ROM 950 and CD 982 or may externally be transferred through the communication interface 990.

A drawing processor 910 is to draw or render an object constructed by primitives (or primitive faces) such as polygons or curved faces at high speed. On drawing of the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing a hidden-surface removal by the use of a Z-buffer or the like, based on the object data and texture. The drawing processor 910 can also perform α-blending (or translucency processing), depth-queuing, mip-mapping, fogging, bi-linear filtering, tri-linear filtering, anti-aliasing, shading and so on. As the image for one frame is written into the frame buffer 922, that image is displayed on a display 912.

A sound processor 930 includes any multi-channel ADPCM sound source or the like to generate high-quality game sounds such as BGMs, sound effects and voices. The generated game sounds are outputted from a speaker 932.

The operational data from a game controller 942 (such as a lever, button, housing, pad-shaped controller or gun-shaped controller), saved data from a memory card 944 and personal data may externally be transferred through a serial interface 940.

ROM 950 has stored a system program and so on. For an arcade game system, the ROM 950 functions as an information storage medium in which various programs have been stored. The ROM 950 may be replaced by any suitable hard disk.

RAM 960 is used as a working area for various processors.

The DMA controller 970 controls the transfer of DMA between the processors and memories (such as RAMs, VRAMs, ROMs or the like).

CD drive 980 drives a CD (information storage medium) 982 in which the programs, image data or sound data have been stored and enables these programs and data to be accessed.

The communication interface 990 is to perform data transfer between the image generating system and any external instrument through a network. In such a case, the network connectable with the communication interface 990 may take any of communication lines (analog phone line or ISDN) or high-speed serial interface bus. The use of the communication line enables the data transfer to be performed through the INTERNET. If the high-speed serial interface bus is used, the data transfer may be carried out between the image generating system and any other game system.

All the processings of the present invention may be executed only through hardware or only through a program which has been stored in an information storage medium or which is distributed through the communication interface. Alternatively, they may be executed both through the hardware and program.

If all the processings of the present invention are executed both through the hardware and program, the information storage medium will have stored a program (and data) for causing hardware (computer) to execute the processings of the present invention. More particularly, the aforementioned program instructs the respective processors 902, 904, 906, 910 and 930 which are hardware and also delivers the data to them, if necessary. Each of the processors 902, 904, 906, 910 and 930 will execute the corresponding one of the means of the present invention based on the instruction and delivered data.

Figure 22A:
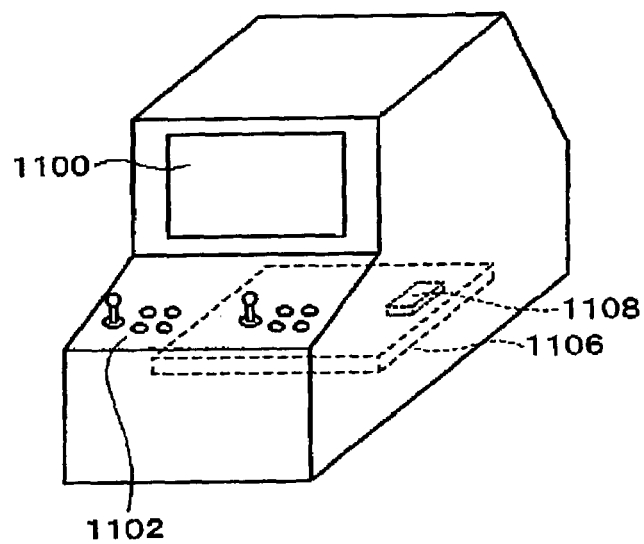
FIGS. 22A, 22B and 22C show various system forms to which this embodiment can be applied.

FIG. 22A shows an arcade game system (or image generating system) to which this embodiment is applied. Players enjoy a game by controller 1102 and the others while viewing a game scene displayed on a display 1100. A system board (circuit board) 1106 included in the game system includes various processor and memories which are mounted thereon. A program (or data) for executing all the processings of the present invention has been stored in a memory 1108 on the system board 1106, which is an information storage medium. Such a program will be referred to "stored program (or stored information)" later.

Figure 22B:
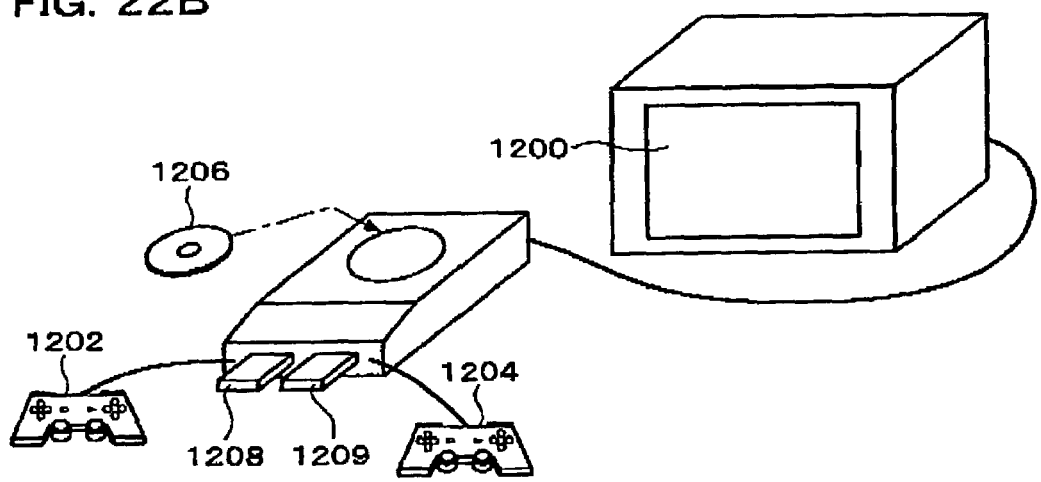

FIG. 22B shows a home game system (or image generating system) to which this embodiment is applied. A player enjoys a game by manipulating controllers 1202, 1204 and others while viewing a game picture displayed on a display 1200. In such a case, the aforementioned stored program (or stored information) has been stored in CD 1206 or memory cards 1208, 1209 which are detachable information storage media in the game system body.

Figure 22C:
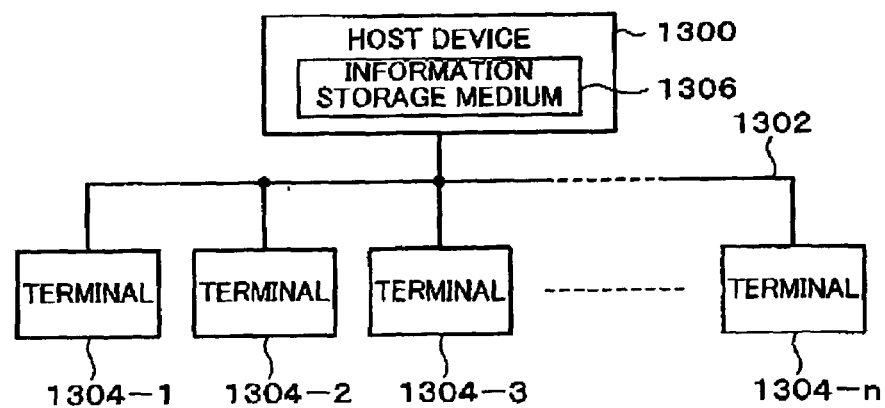

FIG. 22C shows an example wherein this embodiment is applied to a game system which includes a host device 1300 and terminals 1304-1 to 1304-n (or game machines or portable telephones) connected to the host device 1300 through a network (which is a small-scale network such as LAN or a global network such as INTERNET) 1302. In such a case, the above stored program (or information) has been stored in an information storage medium 1306 such as magnetic disk device, magnetic tape device, memory or the like which can be controlled by the host device 1300, for example. If each of the terminals 1304-1 to 1304-n are designed to generate same images and game sounds in a stand-alone manner, the host device 1300 delivers the game program and other data for generating game images and game sounds to the terminals 1304-1 to 1304-n. On the other hand, if the game images and sounds cannot be generated by the terminals in the stand-alone manner, the host device 1300 will generate the game images and sounds which are in turn transmitted to the terminals 1304-1 to 1304-n.

In the arrangement of FIG. 22C, the processings of the present invention may be decentralized into the host device (or server) and terminals. The above information pieces for realizing the respective processing of the present invention maybe distributed and stored into the information storage media of the host device (or server) and terminals.

Each of the terminals connected to the network may be either of home or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above forms, but may be carried out in any of various other forms.

Although this embodiment has been described as to three actions such as vertical-attribute attack, horizontal-attribute attack and movement action, these three actions are not limited to such actions. For example, the third action may be an action different from the movement action.

The technique of setting the one character more advantageously than the other character is not limited to such a technique as previously described in connection with this embodiment, but may take any one of various modified forms.

In the technique of setting one of the characters performing the vertical-attribute attack more advantageously than the other character performing the horizontal-attribute attack, the superiority in the offensive and defensive battle is not necessarily in the form of such a triangular relation as shown in FIG. 3A.

The invention relating to one of the dependent claims may not contain part of the structural requirements in any claim to which the one dependent claim belongs. The primary part of the invention defined by one of the independent claim may be belonged to any other independent claim.

The present invention may be applied to any of various games such as fighting games, shooting games, robot combat games, sports games, competitive games, roll-playing games, music playing games, dancing games and so on.

Furthermore, the present invention can be applied to various game systems (image generating systems) such as arcade game systems, home game systems, large-scaled multi-player attraction systems, simulators, multimedia terminals, various image generating systems (or game systems) including game image generating system boards and so on.

What is claimed is:

1. An image generation method of generating an image comprising:
   defining a relationship of first and second action pairs, the first and second action pairs each defining an advantage between two of first, second and third actions;
   controlling an action of a first character and a second character through a control input by one or more players;
   setting the first character to be more advantageous than the second character based on the relationship when the first character performs the first action and the second character performs the second action, the first action being a vertical-attribute attack;
   setting the first character to be more advantageous than the second character based on the relationship when the first character performs the second action and the second character performs the third action, the second action being a horizontal-attribute attack;
   setting the first character to be more advantageous than the second character based on the relationship when the first character performs the third action and the second character performs the first action, the third action being a movement action in which the first character moves in an arbitrary direction within an object space and the first action being performed by the second character in a direction substantially along a vertical plane; and
   generating an image viewed through a virtual camera within the object space in which a plurality of objects including the first and second characters are disposed with their respective advantages,
   wherein a hit-judgment in which a hit has been made is canceled when the first character performs the movement action and the second character performs the vertical-attribute attack, even when the vertical-attribute attack by the second character is judged to have hit the first character.

2. The image generation method as defined in claim 1,
wherein the first action is performed in a direction substantially along a vertical plane, and
wherein the second action is performed in a direction substantially along a horizontal plane.

3. The image generation method as defined in claim 2,
wherein, when a first hit area of the vertical-attribute attack performed by the first character hits a second hit area of the horizontal-attribute attack performed by the second character, the second character is caused to perform an action showing that the second character has been attacked or to be inoperative for a given time period.

4. The image generation method as defined in claim 3,
wherein the first hit area is a first pseudo hit area larger than a hit area specified by an orbit of the vertical-attribute attack performed by the first character, and
wherein the second hit area is a second pseudo hit area larger than a hit area specified by an orbit of the horizontal-attribute attack performed by the second character.

5. The image generation method as defined in claim 1,
wherein the second action is performed by the first character in a direction substantially along a horizontal plane, and
wherein the third action is a movement action in which the second character moves in an arbitrary direction within the object space.

6. The image generation method as defined in claim 5,
wherein the amount of compensation by which the first character is turned toward the second character is set to be larger than other attacking actions, when the first character performs the horizontal-attribute attack and the second character performs the movement action.

7. The image generation method as defined in claim 1,
wherein a hit-judgment is canceled when the first character is out of a given range of angles including a direction which the second character faces, even when the vertical-attribute attack by the second character is judged to have hit the first character.

8. The image generation method as defined in claim 1,
wherein a position or direction of the virtual camera is changed such that a hit point is invisible from the virtual camera, when a hit-judgment is canceled.

9. The image generation method as defined in claim 1,
wherein a compensated image in which the vertical-attribute attack by the second character appears not to have hit the first character is generated on generation of a replay image, when a hit-judgment is canceled.

10. The image generation method as defined in claim 1,
wherein, when an attribute parameter for offense and defense in any one of the first, second and third actions is changed, an attribute parameter for offense and defense in at least one of the other actions is also changed at the same time.

11. An image generation method of generating an image comprising:
defining a relationship of first and second action pairs, wherein a first action is associated with a first advantage and a second action is associated with a second advantage, the first advantage being more than the second advantage;
controlling an action of a first character and a second character through a control input by one or more players;
setting the first character more advantageously than the second character based on the relationship when the first character performs the vertical-attribute attack using a weapon in a direction substantially along a vertical plane and the second character performs a horizontal-attribute attack using a weapon in a direction substantially along a horizontal plane, wherein the vertical-attribute attack and the horizontal-attribute attack form a first and second action pair;
generating an image viewed through a virtual camera within an object space in which a plurality of objects including the first and second characters are disposed with their respective advantages;
performing a first hit check between a weapon and a character using a first hit area defined by a movement locus of the weapon; and
performing a second hit check between two weapons using a second hit area that is different than the first hit area, the second hit area being defined by the movement locus of the weapons.

12. The image generation method as defined in claim 11,
wherein, when the second hit area of the vertical-attribute attack performed by the first character hits the second hit area of the horizontal-attribute attack performed by the second character, the second character is caused to perform an action showing that the second character has been attacked or to be inoperative for a given time period.

13. The image generation method as defined in claim 12,
wherein the second hit area of the vertical-attribute attack performed by the first character is a first pseudo hit area larger than a hit area specified by an orbit of the vertical-attribute attack performed by the first character, and
wherein the second hit area of the horizontal-attribute attack performed by the second character is a second pseudo hit area larger than a hit area specified by an orbit of the horizontal-attribute attack performed by the second character.

14. A computer-readable medium having a program recorded thereon, the program performing a method of generating an image comprising:
defining a relationship of first and second action pairs, the first and second action pairs each defining an advantage between two of first, second and third actions;
controlling an action of a first character and a second character through a control input by one or more players;
setting the first character to be more advantageous than the second character when based on the relationship the first character performs the first action and the second character performs the second action, the first action being a vertical-attribute attack;
setting the first character to be more advantageous than the second character based on the relationship when the first character performs the second action and the second character performs the third action, the second action being a horizontal-attribute attack;
setting the first character to be more advantageous than the second character based on the relationship when the first character performs the third action and the second character performs the first action, the third action being a movement action in which the first character moves in an arbitrary direction within an object space and the first action being performed by the second character in a direction substantially along a vertical plane; and
generating an image viewed through a virtual camera within the object space in which a plurality of objects including the first and second characters are disposed with their respective advantages, wherein a hit-judgment in which a hit has been made is canceled when the first character performs the movement action and the second character performs the vertical-attribute attack, even when the vertical-attribute attack by the second character is judged to have hit the first character.

15. The computer-readable medium as defined in claim 14, wherein the first action is performed in a direction substantially along a vertical plane, and wherein the second action is performed in a direction substantially along a horizontal plane.

16. The computer-readable medium as defined in claim 15, wherein, when a first hit area of the vertical-attribute attack performed by the first character hits a second hit area of the horizontal-attribute attack performed by the second character, the second character is caused to perform an action showing that the second character has been attacked or to be inoperative for a given time period.

17. The computer-readable medium as defined in claim 16, wherein the first hit area is a first pseudo hit area larger than a hit area specified by an orbit of the vertical-attribute attack performed by the first character, and wherein the second hit area is a second pseudo hit area larger than a hit area specified by an orbit of the horizontal-attribute attack performed by the second character.

18. The computer-readable medium as defined in claim 14, wherein the second action is performed by the first character in a direction substantially along a horizontal plane, and wherein the third action is a movement action in which the second character moves in an arbitrary direction within the object space.

19. The computer-readable medium as defined in claim 18, wherein the amount of compensation by which the one character is turned toward the other character is set to be larger than other attacking actions, when the first character performs the horizontal-attribute attack and the second character performs the movement action.

20. The computer-readable medium as defined in claim 14, wherein a hit-judgment is canceled when the first character is out of a given range of angles including a direction which the second character faces, even when the vertical-attribute attack by the second character is judged to have hit the first character.

21. The computer-readable medium as defined in claim 14, wherein a position or direction of the virtual camera is changed such that a hit point is invisible from the virtual camera, when a hit-judgment is canceled.

22. The computer-readable medium as defined in claim 14, wherein a compensated image in which the vertical-attribute attack by the second character appears not to have hit the first character is generated on generation of a replay image, when a hit-judgment is canceled.

23. The computer-readable medium as defined in claim 14, wherein, when an attribute parameter for offense and defense in any one of the first, second and third actions is changed, an attribute parameter for offense and defense in at least one of the other actions is also changed at the same time.

24. A computer-readable medium having a program recorded thereon, the program performing a method of generating an image comprising:

defining a relationship of first and second action pairs, wherein a first action is associated with a first advantage and a second action is associated with a second advantage, the first advantage being more than the second advantage;

controlling an action of a first character and a second character through a control input by one or more players;

setting the first character more advantageously than the second character based on the relationship when the first character performs the vertical-attribute attack using a weapon in a direction substantially along a vertical plane and the second character performs a horizontal-attribute attack using a weapon in a direction substantially along a horizontal plane, wherein the vertical-attribute attack and the horizontal-attribute attack form a first and second action pair;

generating an image viewed through a virtual camera within an object space in which a plurality of objects including the first and second characters are disposed with their respective advantages;

performing a first hit check between a weapon and a character using a first hit area defined by a movement locus of the weapon; and performing a second hit check between two weapons using a second hit area that is different than the first hit area, the second hit area being defined by the movement locus of the weapons.

25. The computer-readable medium as defined in claim 24, wherein, when the second hit area of the vertical-attribute attack performed by the first character hits a second hit area of the horizontal-attribute attack performed by the second character, the second character is caused to perform an action showing that the second character has been attacked or to be inoperative for a given time period.

26. The computer-readable medium as defined in claim 25, wherein the second hit area of the vertical-attribute attack performed by the first character is a first pseudo hit area larger than a hit area specified by an orbit of the vertical-attribute attack performed by the first character, and wherein the second hit area of the horizontal-attribute attack performed by the second character is a second pseudo hit area larger than a hit area specified by an orbit of the horizontal-attribute attack performed by the second character.

27. A method for generating an image, comprising:

defining a plurality of actions;

defining a relationship of a first and second action pair, wherein a first action is associated with a first action advantage, a second action is associated with a second action advantage, and the first action advantage is greater than the second action advantage, a second and third action pair, wherein the second action is set to be more advantageous than the third action, and a first and third action pair, wherein a third action is set to be more advantageous than the first action, the first action being a vertical-attribute attack, the second action being a horizontal-attribute attack, and the third action being a movement action;

controlling the first character to perform a first character action and the second character to perform a second character action;

obtaining a first advantage and a second advantage having the first and second character actions as the first and second action pair; and generating an image of the first character having the obtained the first advantage and the second character having the obtained the second advantage, wherein a hit-judgment in which a hit has been made is canceled when the first character performs the movement action and the second character performs the vertical-attribute attack, even when the vertical-attribute attack by the second character is judged to have hit the first character.

* * * * *